(12) United States Patent
Yoshida

(10) Patent No.: US 7,534,482 B2
(45) Date of Patent: May 19, 2009

(54) HONEYCOMB STRUCTURAL BODY

(75) Inventor: Yutaka Yoshida, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 417 days.

(21) Appl. No.: 10/518,020

(22) PCT Filed: Oct. 7, 2003

(86) PCT No.: PCT/JP03/12842

§ 371 (c)(1),
(2), (4) Date: Dec. 15, 2004

(87) PCT Pub. No.: WO2004/031101

PCT Pub. Date: Apr. 15, 2004

(65) Prior Publication Data

US 2005/0214504 A1    Sep. 29, 2005

(30) Foreign Application Priority Data

Oct. 7, 2002    (JP) .............................. 2002-293691

(51) Int. Cl.
*B32B 3/12* (2006.01)
*B01D 39/06* (2006.01)
*B01D 39/00* (2006.01)
*B01D 59/50* (2006.01)

(52) U.S. Cl. .................. 428/116; 428/117; 55/523; 55/282.2; 55/282.3; 55/482; 55/484; 55/502

(58) Field of Classification Search ............... 428/116, 428/117; 156/89, 252; 55/523, 282.2, 282.3, 55/482, 484, 502
See application file for complete search history.

(56) References Cited

U.S. PATENT DOCUMENTS

| 4,293,357 | A  | * | 10/1981 | Higuchi et al. ........... 156/89.22 |
| 5,914,187 | A  |   | 6/1999  | Naruse et al. |
| 5,930,994 | A  |   | 8/1999  | Shimato et al. |
| 6,447,564 | B1 |   | 9/2002  | Ohno et al. |
| 6,565,630 | B2 |   | 5/2003  | Ohno et al. |

(Continued)

FOREIGN PATENT DOCUMENTS

EP        1 277 714 A1     1/2003

(Continued)

OTHER PUBLICATIONS

U.S. Appl. No. 10/518,020, filed Dec. 15, 2004, Yoshida.
Derwent Publications, AN 1993-070915, XP-002370065, JP 5-17227, Jan. 26, 1993.

*Primary Examiner*—Timothy M Speer
*Assistant Examiner*—Gordon R Baldwin
(74) *Attorney, Agent, or Firm*—Oblon, Spivak, McClelland, Maier & Neustadt, P.C.

(57) ABSTRACT

A honeycomb structural body is constituted with a ceramic block made by arranging a plurality of through-holes side by side in the longitudinal direction through partition walls and sealing either one end portions of these through-holes. The ceramic block of this honeycomb structural body is made of a composite member consisting of ceramic particles and amorphous silicon, so that the honeycomb structural body has an excellent compression strength even if its porosity is increased, and is less in the lowering of mechanical strength even if it is heated to a high temperature, and is excellent in the durability.

19 Claims, 8 Drawing Sheets

U.S. PATENT DOCUMENTS

| | | |
|---|---|---|
| 6,669,751 B1 | 12/2003 | Ohno et al. |
| 6,770,116 B2 | 8/2004 | Kojima |
| 6,797,666 B2 * | 9/2004 | Harada et al. ............... 502/180 |
| 2002/0011683 A1 | 1/2002 | Gadkaree et al. |
| 2004/0031264 A1 | 2/2004 | Kojima |
| 2004/0033175 A1 | 2/2004 | Ohno et al. |
| 2004/0055265 A1 | 3/2004 | Ohno et al. |
| 2004/0223892 A1 | 11/2004 | Kojima |
| 2006/0068159 A1 | 3/2006 | Komori et al. |
| 2006/0217262 A1 | 9/2006 | Yoshida |
| 2006/0288678 A1 | 12/2006 | Yoshida |

FOREIGN PATENT DOCUMENTS

| | | | |
|---|---|---|---|
| EP | 1 340 734 A1 | | 9/2003 |
| JP | 5-17227 | | 1/1993 |
| JP | 03188191 | * | 1/1993 |
| JP | 06-182228 | | 7/1994 |
| JP | 2001-97777 | | 4/2001 |
| JP | 2001-199777 | | 7/2001 |
| JP | 2002-37673 | | 2/2002 |
| JP | 2002-060279 | | 2/2002 |
| JP | 2002-154876 | | 5/2002 |
| JP | 2002-201082 | | 7/2002 |
| JP | 2002-273131 | | 9/2002 |
| JP | 2003-146763 | | 5/2003 |
| WO | WO 01/79138 A1 | | 10/2001 |
| WO | 01 93984 | | 12/2001 |
| WO | 02 076579 | | 10/2002 |
| WO | 2004-076027 | | 9/2004 |
| WO | 2004-106702 | | 12/2004 |
| WO | 2004/111398 | | 12/2004 |
| WO | 2004/113252 | | 12/2004 |
| WO | 2005/000445 | | 1/2005 |
| WO | 2005/002709 | | 1/2005 |
| WO | 2005/005018 | | 1/2005 |
| WO | WO 2005/044425 A1 | | 5/2005 |

* cited by examiner

Section at A-A line

30 Honeycomb structural body
35 Ceramic block
33 Wall portion
31 Through-hole 30
35
31
33
32 Plugging material Section at B-B line

HONEYCOMB STRUCTURAL BODY

RELATED APPLICATION

This application is an application claiming a priority right based on Japanese Patent Application of 2002-293691 filed on Oct. 7, 2002.

TECHNICAL FIELD

The present invention relates to a honeycomb structural body used as a filter, a catalyst carrier or the like for removing particulates and the like in an exhaust gas discharged from an internal-combustion engine such as a diesel engine or the like.

BACKGROUND ART

Recently, it has become a problem that particulates contained in the exhaust gas discharged from the internal-combustion engine in vehicles such as buses, trucks and the like, or construction machines have caused much harm to environment and the human body.

There are proposed various filters wherein the exhaust gas is passed through a porous ceramic to catch particulates in the exhaust gas and purify the exhaust gas.

As such a ceramic filter, there has been known a honeycomb filter constituted that a plurality of through-holes are arranged side by side in one direction and partition walls separating the through-holes from each other act as a filter.

That is, one end portions of the through-holes formed in the honeycomb filter located at an inlet side or an outlet side of the exhaust gas are plugged with a plugging material so as to form a so-called checkered pattern, wherein the exhaust gas flowed into one through-holes is inevitably passed through the partition walls separating these through-holes and thereafter flowed out from the other through-holes, and as a result, the particulates are caught by the portions of the partition walls in the passing through the partition walls to purify the exhaust gas.

With such a purification of the exhaust gas, the particulates are gradually accumulated at the portions of the partition walls separating the through-holes of the honeycomb filter to cause the clogging to thereby obstruct ventilation. In the above honeycomb filter, therefore, it is required to conduct regeneration treatment by regularly burning and removing the particulates as a cause of clogging with the use of a heating means such as a heater or the like.

In the past, as the honeycomb filter have been known ones consisting of silicon carbide or cordierite, but as the honeycomb filter is heated to a high temperature with the high-temperature exhaust gas in the catching of the particulates or by the heating means such as heater or the like in the regeneration treatment, a filter made of silicon carbide having more excellent heat resistance is considered to be useful.

As the honeycomb filter made of silicon carbide, JP-A-6-182228 discloses, for example, a honeycomb filter produced by using silicon carbide powder as a raw material, shaping it into a predetermined form, drying and thereafter firing (re-crystallization method).

And also, JP-A-2001-199777 discloses, for example, a honeycomb structural body obtained by bonding ceramic particles of silicon carbide or the like with a vitreous oxide selected from the group consisting of $SiO_2$, $Al_2O_3$, $B_2O_3$ and $Na_2O$.

Further, JP-A-2002-60279 and JP-A-2002-154876 disclose, for example, a honeycomb structural body made by adding metallic silicon and an organic binder to silicon carbide powder, mixing and kneading them, shaping into a honeycomb form, and thereafter firing to bond the above silicon carbide powder through metallic silicon.

The honeycomb filter or honeycomb structural body disclosed in the above literatures is set within a cylindrical casing at a state of winding a holding sealing material for performing a role of shock absorption, thermal insulation or the like around the outer periphery while applying a significant compression load, and this casing is arranged in an exhaust passage of an internal-combustion engine to constitute an exhaust gas purification apparatus. By functioning this exhaust gas purification apparatus is conducted the aforementioned purification of the exhaust gas.

Recently, it has been developed to carry a catalyst for removing CO, HC and NOx in the exhaust gas through oxidation and reduction or a catalyst for promoting combustion of caught particulates on the wall portion of the honeycomb filter or the honeycomb structural body disclosed in the above literatures.

Generally, the above catalyst is carried on the wall portion of the honeycomb filter or honeycomb structural body through a catalyst support layer having a large specific surface area such as γ-alumina or the like, but in order to enhance the efficiency of catalytic reaction between the exhaust gas and the catalyst, it is desirable to carry the catalyst as large as possible. For this end, it is necessary to add a large amount of a catalyst support layer to the wall portions of the honeycomb filter or honeycomb structural body as far as possible, whereby it is intended to highly increase the porosity of the honeycomb filter or honeycomb structural body.

However, the honeycomb filter disclosed in JP-A-6-182228 has a problem of becoming brittle and lowering compression strength if the porosity is raised.

Therefore, the above honeycomb filter has a tendency that it becomes easily breakable by compression load added in case of setting within a casing through the above-described holding sealing material, and the setting within the casing becomes difficult.

Furthermore, the above honeycomb filter is used by successively repeating the treatments such as catching and regeneration, so that it is subjected to thermal stress, and there is a problem that if such a thermal stress is applied, the ceramic particles themselves are broken between the ceramic particles to cause visualable size cracks.

And also, the honeycomb structural body disclosed in JP-A-2002-60279 has a structure of bonding silicon carbide particles with the use of metal silicon, so that internal stress can be somewhat mitigated at the bonding point of silicon carbide (metal silicon). Therefore, in case of making the porosity of the honeycomb structural body high, the compression strength is somewhat improved as compared with the honeycomb filter disclosed in JP-A-6-182228, but no improvement by a large margin can be recognized, and there is a problem of breaking by compression load added when setting within the casing.

Since the above honeycomb filter is also used by successively repeating the treatments such as catching and regeneration, so that it is subjected to thermal stress, and there is a problem that if such a thermal stress is applied, fine cracks hardly confirmed visually but confirmable by the observation through SEM are caused in silicon at the bonding portion between the ceramic particles, and as such fine cracks grow, the ceramic particles are broken between the ceramic particles to cause visualable size cracks or removal of the particles.

Further, the honeycomb structural body disclosed in JP-A-2001-199777 has a structure of bonding ceramic particles such as silicon carbide or the like through a vitreous substance and can mitigate internal stress at the bonding point of the ceramic particles (vitreous oxide) as compared with the honeycomb structural bodies disclosed in JP-A-2002-60278 and JP-A-2002-154876, so as to further improve compression strength. However, since the above vitreous oxide changes to be crystalline at a low temperature as compared with metal silicon, there is a problem that when the honeycomb structural body is heated to a high temperature in the regeneration treatment or the like, the vitreous oxide is crystallized to lower the strength of the honeycomb structural body itself, and the structural body is broken by a pressure of the exhaust gas flowed therein.

The present invention is made for solving the above problems inherent to the conventional techniques, and its object is to provide a honeycomb structural body having an excellent compression strength even in the increase of the porosity and being less in the lowering of mechanical strength even in the heating to the high temperature.

DISCLOSURE OF THE INVENTION

The inventors have made various studies for solving the above problems inherent to the conventional techniques and found that a composite material made of ceramic particles and amorphous silicon, particularly a porous ceramic formed by bonding ceramic particles through amorphous silicon is effective as a material constructing a honeycomb structural body, and the invention guising the following contents has been accomplished.

That is, the present invention is a honeycomb structural body comprising a ceramic block made by arranging a plurality of through-holes side by side in the longitudinal direction through partition walls and plugging either one end portions of these through-holes, characterized in that the ceramic block is formed with a composite material consisting of ceramic particles and amorphous silicon.

The honeycomb structural body according to the present invention comprises the ceramic block by arranging a plurality of the through-holes side by side in the longitudinal direction through the partition walls and formed with the composite material consisting of ceramic particles and amorphous silicon. The ceramic block may be composed by bundling a plurality of columnar ceramic members each formed by arranging a plurality of through-holes side by side in the longitudinal direction through partition walls with a sealing material layer (the honeycomb structural body is also referred to as an assembly-type honeycomb structural body hereinafter), or may be composed of a ceramic member formed as one ceramic block as a whole (the filter is also referred to as an integral-type honeycomb structural body hereinafter).

When the honeycomb structural body according to the present invention is the assembly-type honeycomb structural body, the wall portion consists of the partition walls separating the through-holes of the ceramic member, the outer walls of the ceramic members and the sealing material layers functioning as an adhesive layer between the ceramic members, while when it is the integral-type honeycomb structural body, the wall portion is composed of only one kind of partition walls.

In the present invention, the ceramic block constituting the honeycomb structural body is preferable so that a plurality of the through-holes are plugged with a plugging material at one end portion and the through-holes not plugged with the plugging material are plugged with plugging material at the other end portion.

Because, the surface area of the partition wall can be increased, and the particulates can be thinly caught by passing through the partition walls having the thus enlarged surface area. Therefore, it is possible to reduce the passing resistance of the exhaust gas to lower the pressure loss.

And also, the composite material forming the ceramic block in the present invention is preferable to be a porous ceramic formed by bonding ceramic particles through the amorphous silicon.

The amorphous silicon has a structure having a high degree of freedom such that it is easily fused under an atmosphere of a high temperature as in the regeneration of the filter and is easily back to the original amorphous silicon as in the completion of the regeneration. Therefore, it is considered that when the thermal stress is applied, even if fine cracks are created between ceramic particles, the growth of the cracks can be prevented by again bonding the particles between silicon.

Furthermore, it is considered at an initial stage that the ceramic particles are bonded and supported through an elastic amorphous silicon to make the initial compression strength high.

In the present invention, the ceramic particles constituting the composite material is preferable to be silicon carbide.

Because it is a material having a high thermal conductivity.

Moreover, in the present invention, the amorphous silicon for bonding the ceramic particles constituting the composite material to each other is low in the crystallinity. Concretely, a half-width of Si peak (2θ=about 28°) in an X-ray diffraction of the honeycomb structural body is preferable to be not less than 1.0° According to the inventors' study, it has been found that the compression strength when the honeycomb structural body constituted with the composite material made by bonding the ceramic particles through silicon has a high porosity is largely related to the crystallinity of the above silicon, and the compression strength of the honeycomb structural body having a high porosity largely changes in accordance with the crystallinity of silicon.

That is, it is considered that when crystallinity of silicon bonding the ceramic particles is lowered so that the half-width of Si peak (2θ=about 28°) in the X-ray diffraction of the honeycomb structural body is not less than 1.0°, even if the porosity of the honeycomb structural body of the present invention is made high, the compression strength becomes excellent.

This is considered due to the fact that the amorphous silicon having the crystallinity lowered as mentioned above has usually an excellent elasticity as compared with crystalline silicon having a higher crystallinity (half-width of Si peak in X-ray diffraction (2θ=about 28°) is less than 1.0°), and in the honeycomb structural body of the present invention using such an amorphous silicon the bonding point between the ceramic particles (amorphous silicon) has an excellent elasticity.

As a result, for example, when the honeycomb structural body having a high porosity according to the present invention is arranged in the above-described cylindrical casing, even if a large compression load is applied to the honeycomb structural body to cause a large internal stress, the above amorphous silicon suitably mitigates the internal stress, and the honeycomb structural body of the present invention becomes excellent in compression strength without easy breakage.

Such an amorphous silicon can be prepared by selecting silicon having low crystallinity as a raw material and firing under a low temperature firing condition.

Moreover, a half-width value of Si peak (2θ=about 28°) in an X-ray diffraction of the honeycomb structural bodies disclosed in JP-A-2002-60279 and JP-A-2002-154876 is less than 1.0° and the crystallinity is rather high, so that it is considered that the compression strength of the conventional honeycomb structural body does not become sufficiently high due to the high crystallinity of the metallic silicon.

When the half-width value of Si peak (2θ=about 28°) in the X-ray diffraction of the honeycomb structural body is less than 1.0°, the crystallinity of the amorphous silicon is high, and the compression strength of the honeycomb structural body using the amorphous silicon does not become sufficiently high.

The upper limit of the half-width value of Si peak (2θ=about 28°) in the X-ray diffraction of the above honeycomb structural body is desirable to be 4.0°.

When the half-width value exceeds 4.0°, the crystallinity of the above amorphous silicon becomes low to easily cause the melting. As a result, it is considered that silicon at the connecting portion becomes less due to the flowing-out and the re-connecting becomes difficult or a space between ceramic particles or a pore is filled with molten silicon, and it is difficult to maintain a shape after regeneration.

BEST MODE FOR CARRYING OUT THE INVENTION

Figure 1:
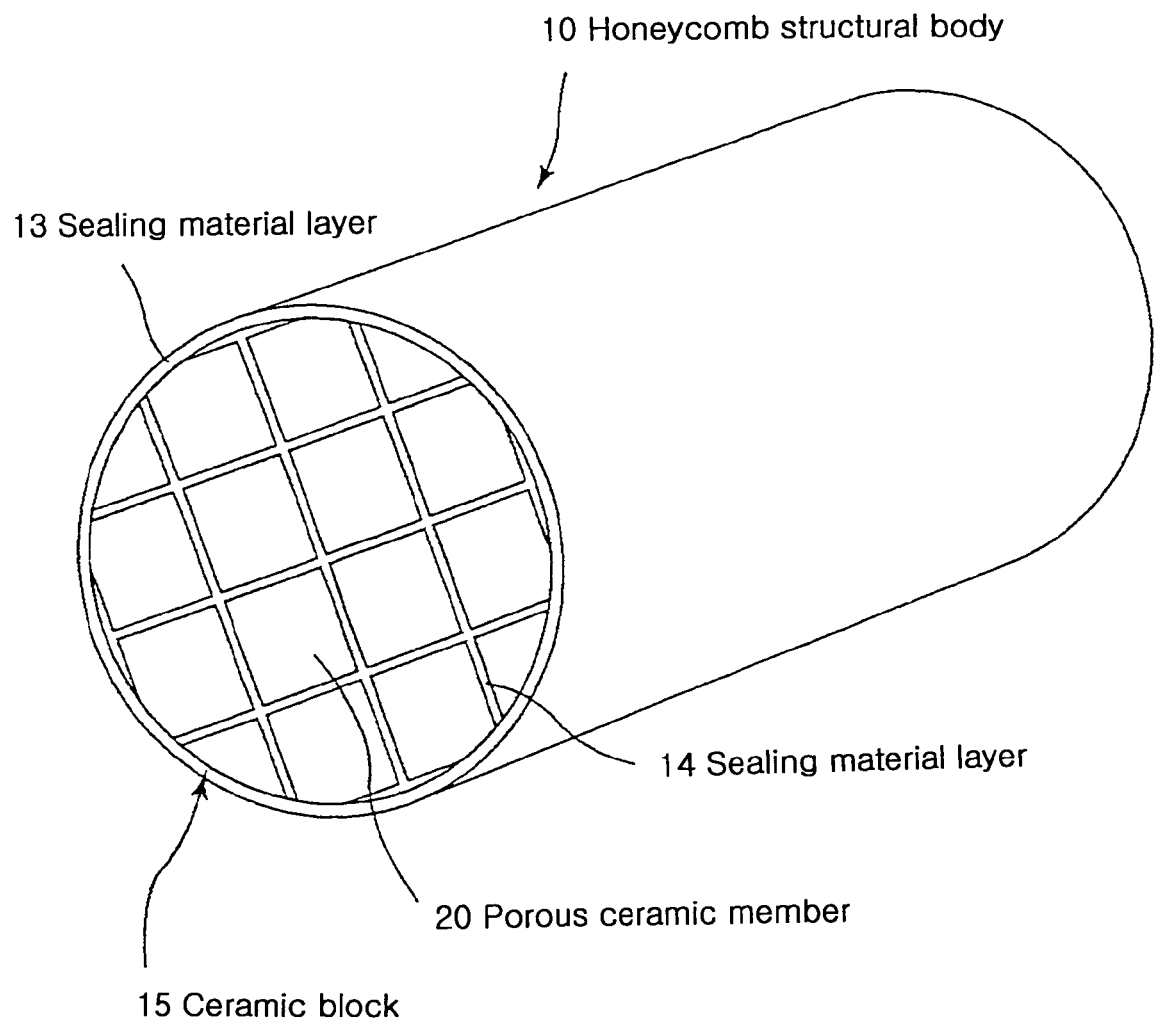
FIG. 1 is a perspective view schematically showing an embodiment of the honeycomb structural body according to the invention.
Figures 2A, 2B:
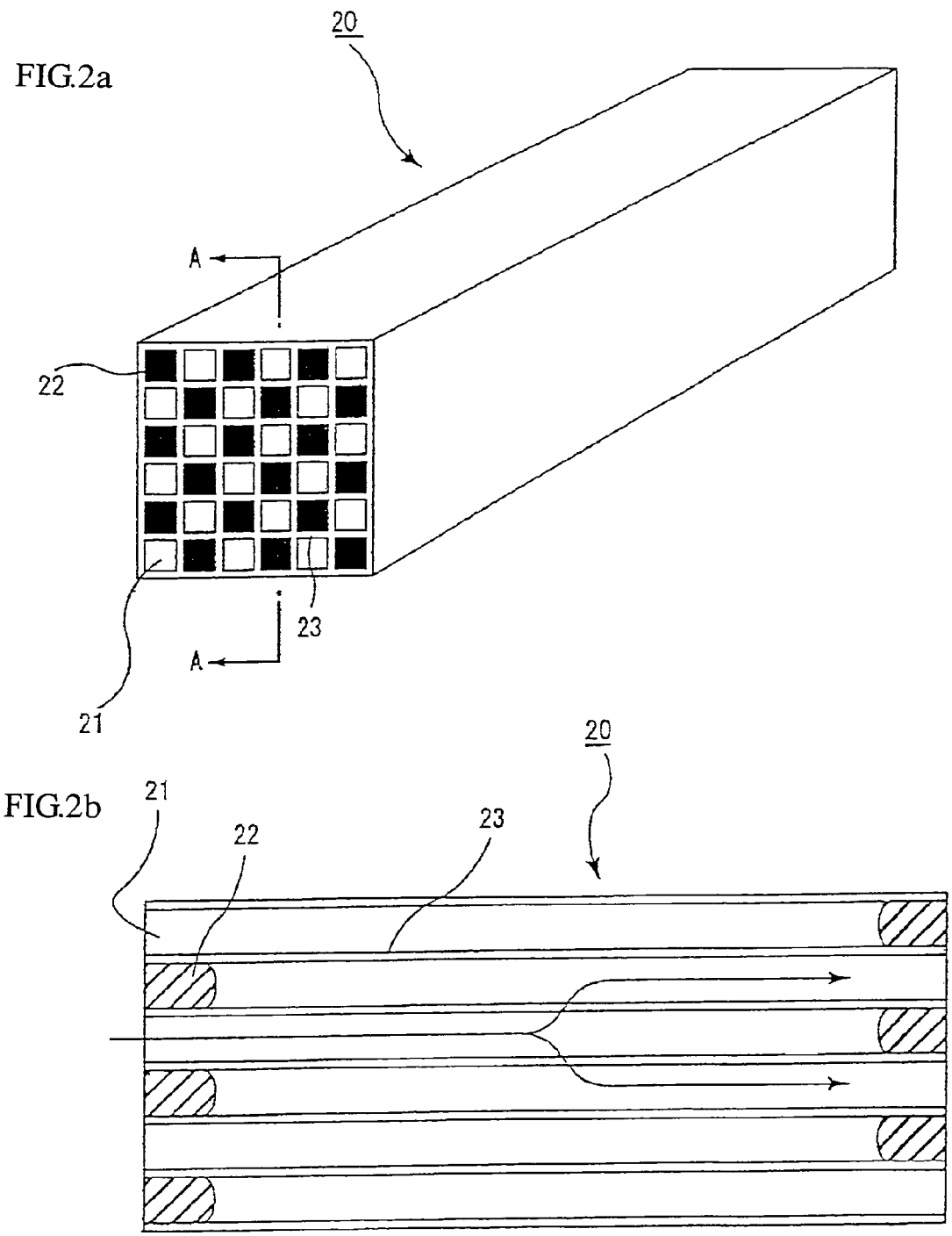
FIG. 2(a) is a perspective view schematically showing an embodiment of the porous ceramic member constituting the honeycomb structural body shown in FIG. 1.
FIG. 2(b) is a section view along a line A-A of the porous ceramic member shown in FIG. 2(a).

FIG. 1 is a perspective view schematically showing a concrete example of an assembly-type honeycomb structural body as an embodiment of the honeycomb structural body of the invention. FIG. 2(a) is a perspective view schematically showing an example of the porous ceramic member constituting the honeycomb structural body shown in FIG. 1 and FIG. 2(b) is a section view along a line A-A of the porous ceramic member shown in FIG. 2(a).

As shown in FIGS. 1 and 2, in the honeycomb structural body 10 of the invention, a plurality of porous ceramic members 20 are connected through sealing material layers 14 to compose a cylindrical ceramic block 15, and a sealing material layer 13 is formed around the circumference of the ceramic block 15.

Also, in the prismatic porous ceramic member 20 are arranged a plurality of through-holes 21 side by side through partition walls 23.

When the honeycomb structural body 10 of the invention is used as a filter for catching particulates in exhaust gas, as shown in FIG. 2(a), the porous ceramic member 20 is desirable so that either one end portions of the through-holes 21 are plugged by a plugging material 22.

That is, in the ceramic block 15 of the honeycomb structural body 10 of the invention, it is desirable that given through-holes 21 are plugged by the plugging material 22 at one end portions and the through-holes 21 not plugged by the plugging material 22 are plugged by a plugging material 22 at the other end portions of the ceramic block 15.

In this case, the exhaust gas flowed into one through-hole 21 always passes through partition walls 23 separating such a through-hole 21 and thereafter flows out from the other through-hole 21, so that the partition walls 23 separating these through-holes from each other can be functioned as a filter for catching particles.

Moreover, the sealing material layer 13 formed around the ceramic block 15 is formed for preventing the leakage of the exhaust gas from the outer circumference of the ceramic block 15 when the honeycomb structural body 10 of the invention is used as the honeycomb filter. Therefore, it is not particularly necessary in accordance with the application of the honeycomb structural body of the invention.

Figure 3A:
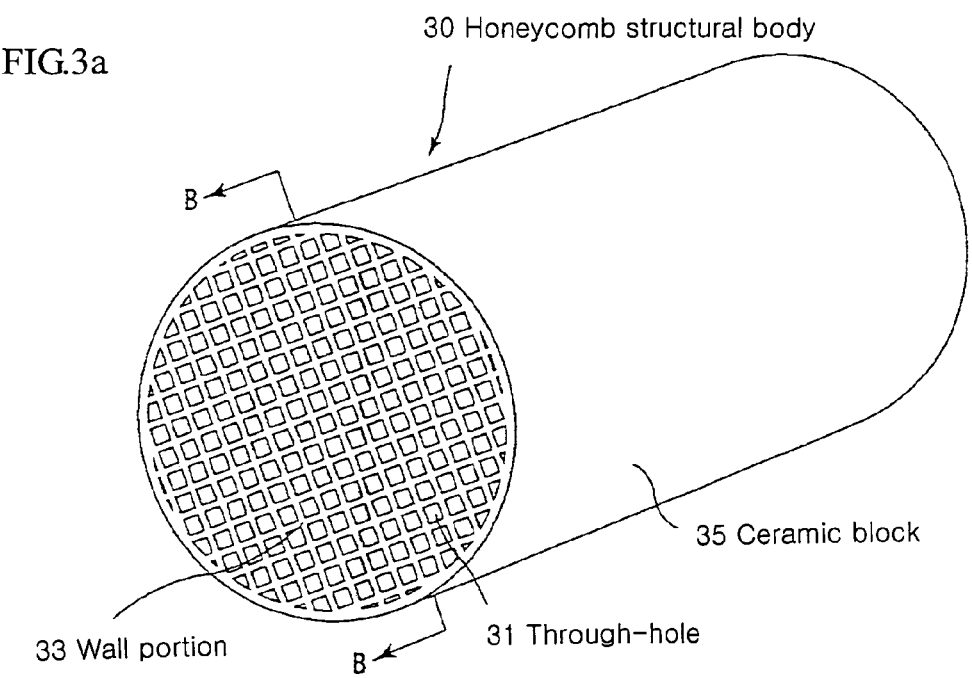
FIG. 3(a) is a perspective view schematically showing another embodiment of the honeycomb structural body according to the invention.

FIG. 3(a) is a perspective view schematically showing an embodiment of an integral-type honeycomb structural body as another example of the honeycomb structural body of the invention.

As shown in FIG. 3(a), the honeycomb structural body 30 of the invention is composed of a cylindrical ceramic block 35 consisting of a porous ceramic with a plurality of through-holes 31 arranged side by side in the longitudinal direction through wall portions 33.

Figure 3B:
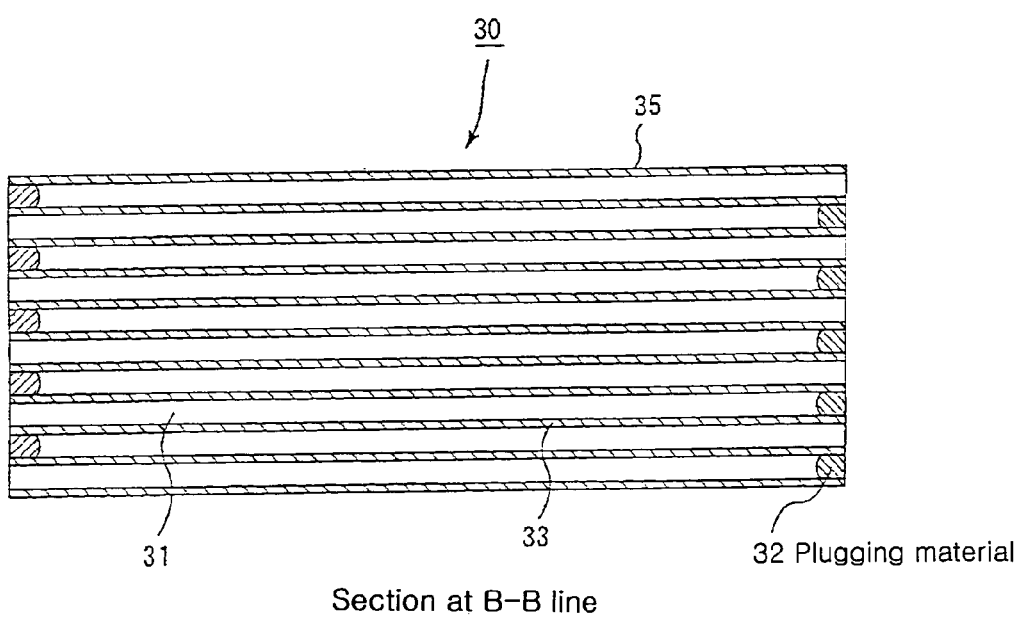
FIG. 3(b) is a section view along a line B-B of the honeycomb structural body shown in FIG. 3(a).

Also, when the honeycomb structural body 30 of the invention is used as a honeycomb filter for catching particulates in the exhaust gas, the ceramic block 35 is desirable to be plugged with a plugging material 32 at either one of end portions of the through-holes 31 as shown in FIG. 3(b).

That is, in the ceramic block 35 of the honeycomb structural body 30 of the invention, it is desirable that the given through-holes 31 are plugged with a plugging material 32 at their one end portions and the through-holes 31 not plugged with the plugging material 32 are plugged with a plugging material 32 at the other end portions of the ceramic block 35.

In this case, the exhaust gas flowed into one through-hole 31 always passes through the wall portions 33 separating the through-hole 31, and thereafter flows out from the other through-hole 31, so that the wall portion 33 for separating these through-holes from each other can be functioned as a filter for catching particles.

Although there is not shown in FIG. 3, a sealing material layer may be formed around the ceramic block 35 likewise the honeycomb structural body shown in FIG. 1.

In the honeycomb structural body according to the invention, the ceramic block is preferable to be made of a porous ceramic obtained by bonding ceramic particles through amorphous silicon.

As the ceramic particles are used, for example, oxide ceramics such as cordierite, alumina, silica, mullite, zirconia, yttria and the like; carbide ceramics such as silicon carbide, zirconium carbide, titanium carbide, tantalum carbide, tungsten carbide and the like; and nitride ceramics such as aluminum nitride, silicon nitride, boron nitride, titanium nitride and the like.

When the honeycomb structural body according to the invention is an assembly-type honeycomb structural body as shown in FIG. 1, silicon carbide having a large heat resistance, excellent mechanical properties and chemical stability and a large thermal conductivity is desirable among the above ceramic particles.

Also, when the honeycomb structural body according to the invention is an integral-type honeycomb structural body as shown in FIG. 3, the ceramic oxide such as cordierite and the like is used. Because it can cheaply be manufactured, and has a relatively small thermal expansion coefficient, and is not broken when the honeycomb structural body of the invention is used, for example, as the honeycomb filter, and is not oxidized.

The compression strength of the honeycomb structural body of the invention is determined by crystallinity of the amorphous silicon and kind of ceramic particles used and the like, and is desirably within a range of 0.1 MPa-60 MPa, more desirably within a range of 0.5 MPa-30 MPa.

When the compression strength is less than 0.1 MPa, cracks are easily generated by applying a relatively small compression load to the honeycomb structural body and it is difficult to recombine ceramic particles through amorphous silicon. When it exceeds 60 MPa, the degree of freedom of silicon is lost to make re-combination difficult.

In the honeycomb structural bodies shown in FIG. 1 and FIG. 3, the shape of the ceramic block is cylindrical. As long as the ceramic block is columnar, it is not limited to the cylinder, and may be any optional shape such as elliptic cylinder, prismatic cylinder and the like in the invention.

The porosity of the ceramic block constituting the honeycomb structural body of the invention is desirably 50-80%. If the porosity is less than 50%, the amount of bonding point for bonding ceramic particles through amorphous silicon is increased, and even if the crystallinity of the amorphous silicon is not lowered to the above-described extent, the compression strength of the honeycomb structural body is increases due to the increase of the bonding points, and hence there is hardly caused a problem of lowering the compression strength of the honeycomb structural body. On the other hand, when the porosity exceeds 80%, the amount of bonding points for bonding ceramic particles through amorphous silicon is much more decreased, and hence the strength of the honeycomb structural body is lowered due to this decreased bonding point to be easily broken.

Moreover, the porosity can be measured by the conventionally known methods such as a mercury penetration method, an Archimedes method, a scanning electron microscope (SEM) and the like.

Also, the mean pore diameter of the ceramic block is desirable to be 5-100 μm. When the mean pore diameter is less than 5 μm, if the honeycomb structural body of the invention is used as the honeycomb filter, the clogging is easily caused by particulates. While, when the mean pore diameter exceeds 100 μm, particulates pass through pores, and hence the particulates cannot be caught and the function as a filter can not be fulfilled.

As a particle size of the ceramic particle used in the production of the ceramic block, it is desirable to provide a particle having less contraction at a subsequent firing step. For example, it is desirable to have a mean particle size of about 0.3-50 μm. Because, the ceramic block made of porous ceramic having the above-described porosity and mean particle size can be produced by using ceramic particle powder having the above particle size.

In the honeycomb structural body of the invention, if a plugging material is filled in either one end portions of through-holes of the ceramic block, the plugging material is desirable to be made of porous ceramic.

In the honeycomb structural body of the invention, as the ceramic block filled with the above plugging material is made of porous ceramic, it becomes possible to increase adhesive strength of both by rendering the plugging material into the same porous ceramic as in the ceramic block, and also it can be intended to match the thermal expansion coefficient of the ceramic block with the thermal expansion coefficient of the plugging material by controlling the porosity of the plugging material in the same manner as in the ceramic block, whereby it is possible to prevent the occurrence of any gap between the plugging material and the wall portion due to thermal stress in the production or the use, or the occurrence of crack in the plugging material or the wall portion contacting with the plugging material.

When the plugging material consists of porous ceramic, as its material, use is made of the same material as ceramic particle and amorphous silicon constituting the ceramic block.

When the honeycomb structural body of the invention is an assembly-type honeycomb structural body shown in FIG. 1, sealing material layers 13, 14 are formed between the porous ceramic members 20 and on the outer periphery of the ceramic block 15. The sealing material layer 14 formed between the porous ceramic members 20 functions as an adhesive for binding a plurality of the porous ceramic members 20 each other, while the sealing material layer 13 formed on the outer periphery of the ceramic block 15 functions as a plugging material for preventing the leakage of the exhaust gas from the outer periphery of the ceramic block when the honeycomb structural body of the invention is used as the honeycomb filter and the honeycomb structural body 10 of the invention is set in an exhaust passage of an internal combustion engine.

As a material constituting the sealing material layer are used, for example, an inorganic binder, an organic binder, inorganic fibers and/or inorganic particles.

As described above, in the honeycomb structural body of the invention, the sealing material layers are formed between the porous ceramic members and on the outer periphery of the ceramic block, but these sealing material layers may be the same or different materials. Further, when the sealing material layers are made of the same material, the compounding ratio may be the same or different.

As the inorganic binder is used, for instance, silica sol, alumina sol and the like. They may be used alone or in a combination of two or more. Among the above inorganic binders, silica sol is desirable.

As the organic binder is used, for instance, polyvinyl alcohol, methyl cellulose, ethyl cellulose, carboxy methyl cellulose and the like. They may be used alone or in a combination of two or more. Among the above organic binders, carboxy methyl cellulose is desirable.

As the inorganic fiber is used, for instance, ceramic fibers such as silica-alumina, mullite, alumina, silica and the like. They may be used alone or in a combination of two or more. Among the above inorganic fibers, silica-alumina fiber is desirable.

As the inorganic particle may be mentioned, for instance, carbides, nitrides and the like. Concretely, use is made of inorganic powder of silicon carbide, silicon nitride, boron nitride and the like or whisker and so on. They may be used alone or in a combination of two or more. Among the above inorganic particles, silicon carbide having an excellent thermal conductivity is desirable.

The sealing material layer 14 may be a dense body or a porous body for enabling flow of exhaust gas into the inside when the honeycomb structural body of the invention is used as the honeycomb filter. However, the sealing material layer 13 is desirable to be a dense body. Because, when the honeycomb structural body 10 is set in the exhaust passage of an internal combustion engine, the sealing material layer 13 is formed for the purpose of preventing the leakage of the exhaust gas from the outer periphery of the ceramic block 15.

Such honeycomb structural bodies of the invention, as explained in FIGS. 1-3, can be preferably used as a honeycomb filter for the purification of the exhaust gas catching particulates in the exhaust gas discharged from the internal combustion engine such as diesel engine and the like when given through-holes in either one end portions of the ceramic block constituting the honeycomb structural body are filled with the plugging material.

When the honeycomb structural body of the invention is used as a honeycomb filter for purifying the exhaust gas, a catalyst such as Pt and the like may be carried on the wall portion of the ceramic block for promoting combustion of particulates when the regeneration treatment is applied to the honeycomb filter.

Also, when the ceramic block of the honeycomb structural body of the invention is carried with a catalyst of a noble metal such as Pt, Rh, Pd or the like or an alloy thereof, the honeycomb structural body of the invention can be used as a catalyst carrier for conducting the purification of HC, CO and NOx in the exhaust gas discharged from a heat engine such as an internal combustion engine or the like, or a combustion apparatus such as boiler or the like, or the refinement of liquid fuel or gas fuel and the like.

Moreover, in case of using the honeycomb structural body of the invention as the catalyst carrier, the plugging material is not particularly necessary.

As explained above, the honeycomb structural body according to the invention is constituted with the ceramic block made of a composite material by bonding ceramic particles through amorphous silicon.

Moreover, positions of silicon and ceramic can be confirmed, for example, by a reflective electron image of SEM or by mapping of EDS or the like.

The amorphous silicon is low in the crystallinity. Concretely, the half-width value of Si peak ($2\theta$=about 28°) in an X-ray diffraction (it is desirable to measure based on JIS K0131-1996) is not less than 1.0°. The honeycomb structural body using such an amorphous silicon becomes excellent in the compression strength even if the porosity is increased. As a result, even when a large compression load is applied to the honeycomb structural body of the invention to create a large internal stress in the inside thereof, such an internal stress can be preferably mitigated at the bonding point (amorphous silicon) between the ceramic particles and hence the durability becomes excellent without easily generating cracks.

Next, as an example of a method of producing the honeycomb structural body of the invention, there is explained a case of producing the honeycomb structural body wherein a plugging material is filled in predetermined through-holes of a ceramic block.

When the structure of the honeycomb structural body of the invention is an integral-type honeycomb structural body integrally formed as a whole as shown in FIG. 3, extrusion molding is first carried out with the use of raw material paste consisting essentially of ceramic particles and amorphous silicon as described above, to form a ceramic molded body having substantially the same shape as that of the honeycomb structural body shown in FIG. 3.

The raw material paste is desirable to provide the porosity of 50-80% in the ceramic block after the production, and includes, for instance, ones obtained by adding a binder and a dispersion medium to a mixed powder of ceramic particles and amorphous silicon powder.

The method of producing the amorphous silicon powder is not particularly limited, and includes a method wherein a thin film consisting of amorphous silicon is produced by a well-known method and thereafter the resulting thin film is finely pulverized.

As the method of producing the thin film consisting of amorphous silicon are mentioned chemical deposition methods such as plasma CVD method using $SiH_4$ as a raw material, photo-CVD method, ECR-CVD (electro-cyclotron resonance plasma-enhanced chemical vapor deposition) method and the like.

Such amorphous silicon powder holds the role as a binder by fusing in a firing treatment after degreasing treatment mentioned below to wet the surfaced of ceramic particles to thereby bind the ceramic particles together.

The compounding amount of such amorphous silicon powder is appropriately changed in accordance with the particle size, shape and the like of the ceramic particle powder, but is desirable to be 5-50 parts by weight based on 100 parts by weigh of the mixed powder. When the amount is less than 5 parts by weight, the compounding amount of the amorphous silicon powder is too small for sufficiently functioning as the bonding material bonding the ceramic particles, and the strength of the resulting honeycomb structural body (ceramic block) may be insufficient. On the other hand, when it exceeds 50 parts by weight, the resulting honeycomb structural body becomes too densified to lower the porosity and the aforementioned effects of the invention can not be sufficiently obtained. Further, when the honeycomb structural body of the invention is used as the honeycomb filter, there is a fear that the pressure loss in the catching of particulates quickly increases and the function as the filter can not sufficiently obtained.

As the binder are used, for instance, methyl cellulose, carboxymethyl cellulose, hydroxyethyl cellulose, polyethylene glycol, phenolic resin, epoxy resin and the like.

The compounding amount of the binder is desirable to be about 1-10 parts by weight based on 100 parts by weight of ceramic particle powder.

The dispersion medium is not particularly limited, and includes, for example, an organic solvent such as benzene or the like; an alcohol such as methanol or the like, water and so on.

The dispersion medium solution is compounded in a proper amount so as to render the viscosity of the raw material paste into a certain range.

These mixed powder, binder and dispersion medium are mixed by an attritor or the like and fully kneaded by a kneader or the like to form a raw material paste, and thereafter the raw material paste is extrusion molded to prepare the ceramic molded body.

Also, the raw material paste may be added with a molding aid, if necessary.

As the molding aid is used, for instance, ethylene glycol, dextrin, fatty acid soap, polyalcohol and the like.

Further, the raw material paste may be added with balloons made of an oxide ceramic as micro-hollow spheres, spherical acrylic particles, a pore-forming agent such as graphite or the like, if necessary.

As the balloon are used, for instance, alumina balloon, glass micro-balloon, silas balloon, fly ash balloon (FA balloon), mullite balloon and the like. Among them, the fly ash balloon is desirable.

The ceramic molded body is dried by means of a microwave drier, a hot gas drier, a dielectric drier, a reduced pressure drier, a vacuum drier, a freezing drier or the like to form a ceramic dried body, which is then subjected to a plug forming process for plugging predetermined through-holes wherein a plugging paste is filled in such through-holes.

Figure 4A:
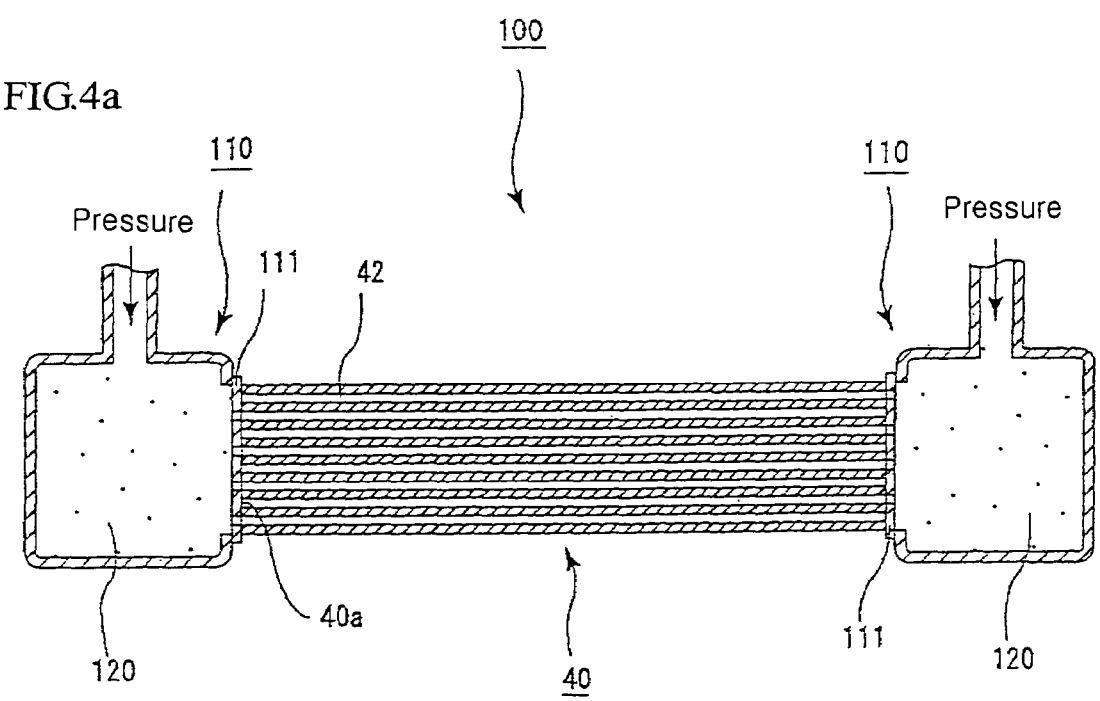
FIG. 4(a) is a section view schematically showing a state of a plug forming process in the production of the honeycomb structural body according to the invention.
Figure 4B:
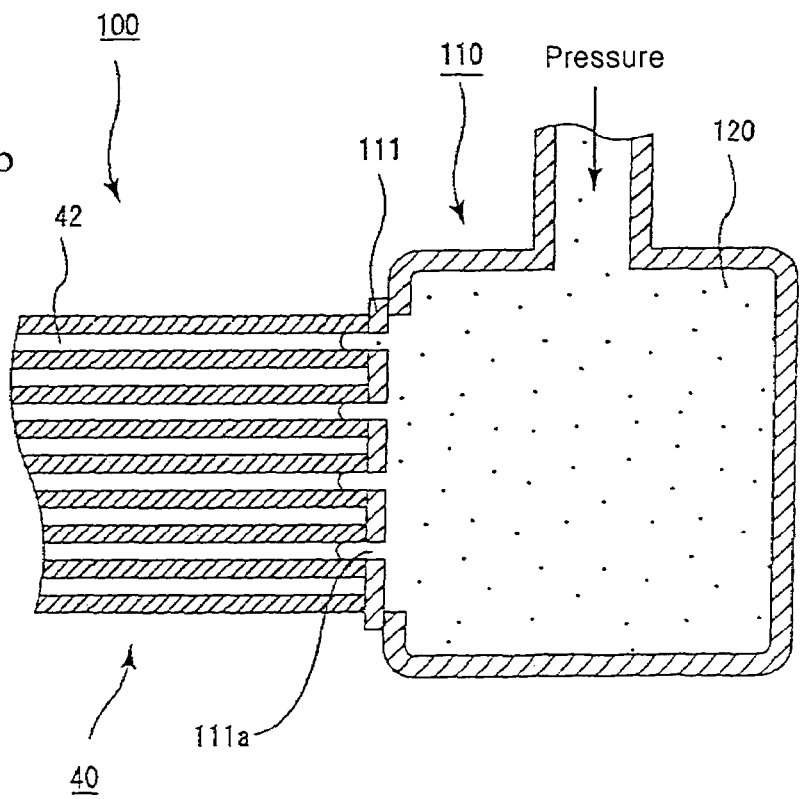
FIG. 4(b) is a partially enlarged section view thereof.

FIG. 4(a) is a section view schematically showing one example of the plugging apparatus used in the plug forming proccess, and FIG. 4(b) is a partially enlarged section view showing a part thereof.

As shown in FIG. 4, the plugging apparatus 100 used in the plug forming process is provided at its side face with a mask 111 having openings 111a of a given pattern, and two sets of a closed-type plugging material discharge vessel 110 filled with a plugging paste 120 are arranged for facing sides formed with the mask 111 each other.

In order to conduct the plug forming process of the ceramic dried body using such a plugging apparatus 100, the ceramic dried body 40 is first fixed between the plugging material discharge vessels 110 so as to contact an end face 40a of the ceramic dried body 40 with the mask 111 formed on the side face of the plugging material discharge vessel 110.

In this case, the opening 111a of the mask 111 and the through-hole 42 of the ceramic dried body 40 are exactly in opposed relation.

Then, a certain pressure is applied to the plugging material discharge vessel 110 through a pump such as a mono-pump or the like, whereby the plugging paste 120 is discharged from the openings 111a of the mask 111 to penetrate the plugging paste 120 into the ends of the through-holes 42 of the ceramic dried body 40. Thus, the predetermined through-holes 42 of the ceramic dried body 40 can be plugged with the plugging paste 120 as a plug material.

Moreover, the plugging apparatus used in the plug forming process is not limited to the plugging apparatus 100 as described above, but may use a system of providing an open-type plugging material discharge vessel disposed a stirring blade therein, and moving the stirring blade in up-down directions so as to fluidize the plugging paste filled in the plugging material discharge vessel and to fill the plugging paste.

As the plugging paste is used, for instance, the same as the raw material paste. However, it is desirable to add a lubricant, a solvent, a dispersant and a binder to the mixed powder used in the raw material paste because the ceramic particles in the plugging paste are prevented from sedimentation.

Next, the ceramic dried body filled with the plugging paste is subjected to a degreasing treatment by heating to about 150-700° C. to remove the binder contained in the ceramic dried body and form a ceramic degreased body.

The degreasing treatment is desirable to be carried out at a temperature lower than that a temperature fusing the amorphous silicon and also the degreasing atmosphere may be an oxidizing atmosphere or an inert gas atmosphere such as nitrogen, argon and the like. Further, an optimum atmosphere as the degreasing atmosphere is suitably selected by taking the amount of the binder used, kind of the ceramic particle and the like into consideration.

Next, the ceramic degreased body is heated to about 900-1100° C. to soften (fuse) the amorphous silicon powder, whereby the ceramic particles are bonded through the amorphous silicon to form porous ceramics, the whole of which can be integrally united to produce a honeycomb structural body (ceramic block) of the invention.

Further, the half-width value of Si peak (2θ=about 28°) in the X-ray diffraction of the thus produced honeycomb structural body becomes not less than 1.0°, and its crystallinity becomes low.

The above produced honeycomb structural body of the invention has such a structure that the plugging material is filled at one ends of predetermined through-holes in the ceramic block and can be suitably used as the honeycomb filter. Also, the wall portion of the ceramic block may be carried with a catalyst such as Pt or the like for promoting combustion of particulates when the honeycomb filter is subjected to a regeneration treatment.

Further, when the honeycomb structural body of the invention is used as a catalyst carrier for conducting the purification of HC, CO and NOx in the exhaust gas discharged from a heat engine such as an internal combustion engine or the like, or a combustion equipment such as a boiler or the like, or the reformation of liquid fuel or gas fuel, the wall portions of the ceramic block may be carried with a catalyst of a noble metal such as Pt, Rh, Pd or the like or an alloy thereof. In this case, the plug forming process for filling the plugging material is not necessarily required.

When the honeycomb structural body of the invention is an assembly-type honeycomb structural body composed by combining a plurality of porous ceramic members through sealing material layers as shown in FIG. 1, the extrusion molding is first carried out by using the raw material paste essentially consisting of the ceramic particles and amorphous silicon to prepare a green shaped body having a shape of the porous ceramic member 20 shown in FIG. 2.

Moreover, as the above raw material paste may be mentioned the same as the raw material paste explained in the integral-type honeycomb structural body described above.

Next, the green shaped body is dried by using a microwave drier or the like to form a dried body, which is then subjected to a plug forming process for plugging through-holes in which the plugging paste is filled in predetermined through-holes of the dried body.

Moreover, as the plugging paste may be mentioned the same as the plugging paste explained in the above-described integral-type honeycomb structural body. As the plug forming process, mention may be made of the same method as in the integral-type honeycomb structural body except that the object of filling the plugging paste is different.

Next, a ceramic degreased body is produced by subjecting the dried body after the plug forming process to a degreasing treatment under the same condition as in the integral-type honeycomb structural body and further heated under the same condition as in the integral-type honeycomb structural body and fired, whereby there can be produced a porous ceramic member with a plurality of through-holes arranged side by side in the longitudinal direction through partitions.

Figure 5:
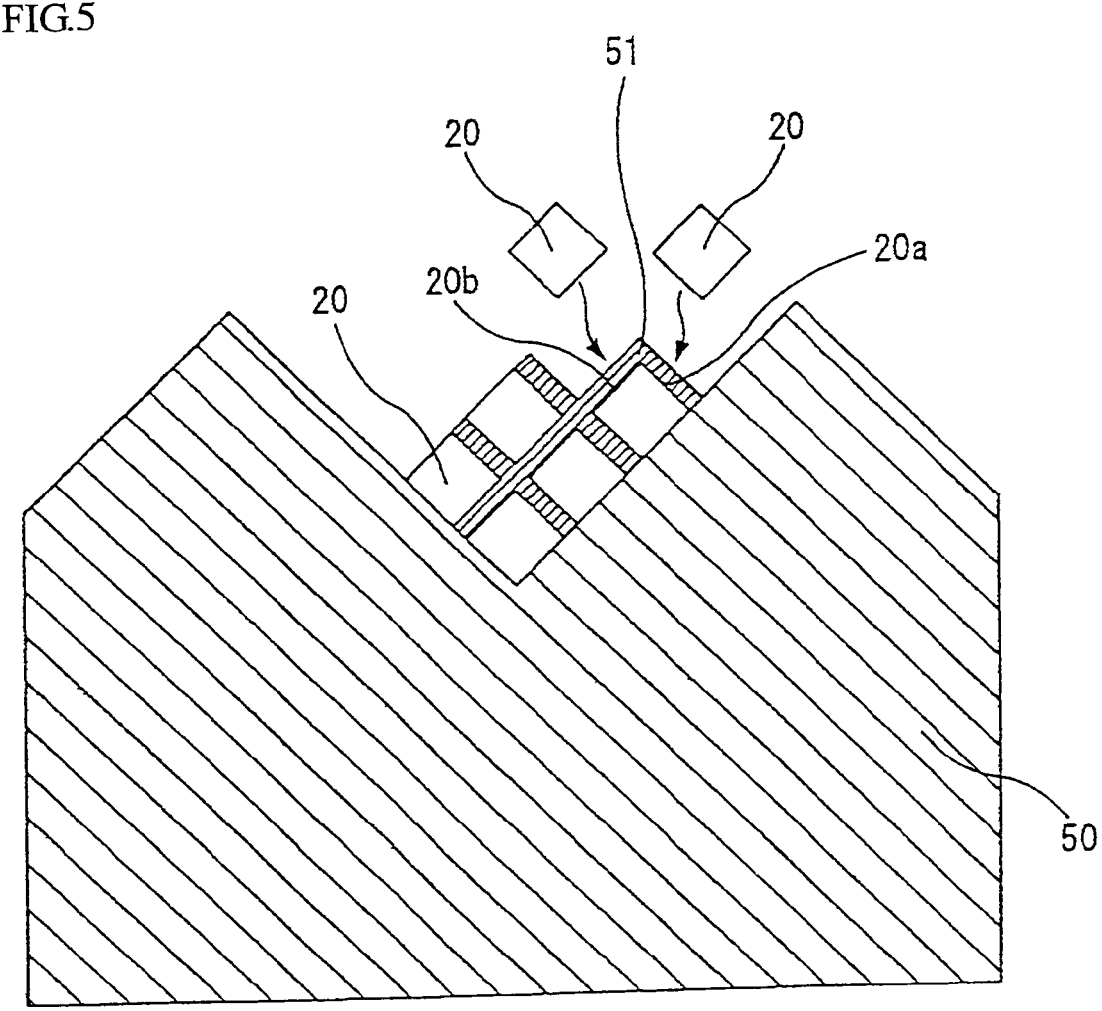
FIG. 5 is a side view schematically showing a state of producing the honeycomb structural body according to the invention.

Further, as shown in FIG. 5, the porous ceramic members 20 are placed on a base 50 having a section of an upper part of V-shaped form at an obliquely inclined state condition so as to pile the porous ceramic members 20 one upon the other at the inclined state, and thereafter a sealing material paste forming a sealing material layer 14 is applied to two upward side faces 20a, 20b at a uniform thickness to form a sealing material paste layer 51, and a step of successively laminating the other porous ceramic members 20 on the sealing material paste layer 51 is repeated to prepare a laminate of the prismatic porous ceramic members 20 having a given size.

Moreover, the material for forming the sealing material paste is as explained in the above honeycomb structural body of the invention, and its explanation is omitted here.

Next, the sealing material paste layer 51 is dried and solidified by heating the laminate of the porous ceramic layers 20 to form a sealing material layer 14, and thereafter the outer peripheral portion thereon is cut into a form shown in FIG. 1 by using, for example, a diamond cutter to prepare a ceramic block 15.

By forming a sealing material layer 13 on the outer periphery of the ceramic block 15 with the above sealing material paste can be produced the honeycomb structural body of the invention in which a plurality of porous ceramic members are bonded through the sealing material layer.

The thus produced honeycomb structural body of the invention is one obtained by filling one ends of predetermined through-holes of the ceramic block (porous ceramic member) with a plugging material, and can suitably be used as the honeycomb filter. In this case, the wall portions of the ceramic block (partitions of the porous ceramic members) may be carried with a catalyst such as Pt or the like for promoting combustion of particulates when the honeycomb filter is subjected to a regeneration treatment.

Moreover, when the honeycomb structural body of the invention is used as a catalyst carrier for purifying HC, CO and NOx in the exhaust gas discharged from a heat engine such as an internal combustion engine or the like or a combustion equipment such as a boiler or the like, or reformation of liquid fuel or gas fuel, a catalyst of a noble metal such as Pt, Rh, Pd or the like or an alloy thereof may be carried on the wall portions of the ceramic block. In this case, the plug forming process for filling the plugging material is not necessarily required.

Next, an exhaust gas purification apparatus using the honeycomb structural body according to the invention is explained.

Figure 6:
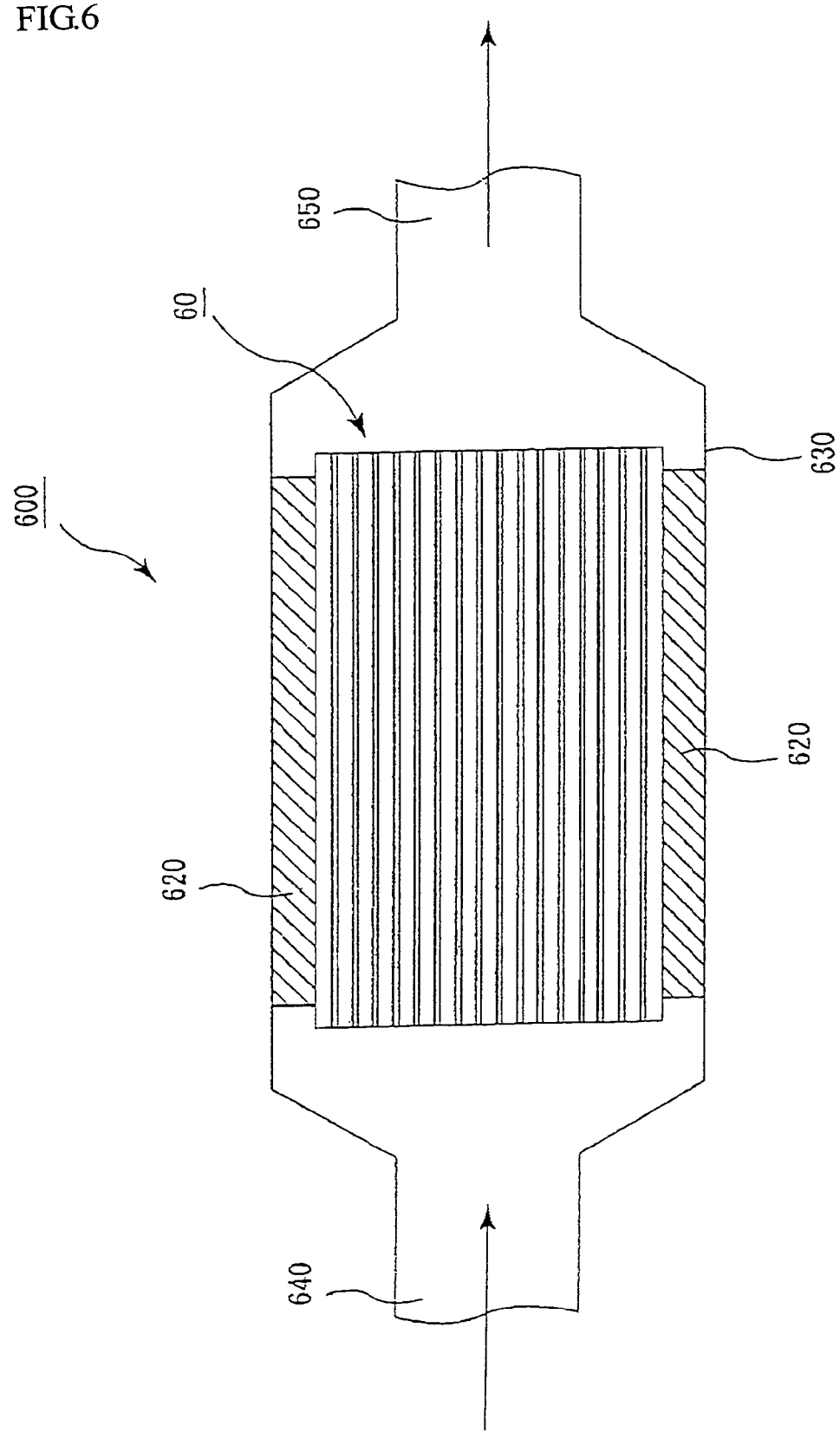
FIG. 6 is a section view schematically showing an embodiment of the exhaust gas purifying apparatus using the honeycomb structural body according to the invention.

When the honeycomb structural body of the invention is used as the honeycomb filter, it is desirable to set in an exhaust gas purification apparatus of a vehicle shown in FIG. 6.

FIG. 6 is a section view schematically showing one example of the exhaust gas purification apparatus of the vehicle provided with the honeycomb structural body (honeycomb filter) of the invention.

As shown in FIG. 6, an exhaust gas purification apparatus 600 mainly comprises a honeycomb filter 60 according to the invention, a casing 630 covering the outside of the honeycomb filter 60 and a holding sealing material member 620 disposed between the honeycomb filter 60 and the casing 630, in which an inlet pipe 640 connected to an internal combustion engine such as an engine or the like is connected to an end portion of the casing 630 at a side of introducing the exhaust gas and an outlet pipe 650 connected to an exterior is connected to the other end portion of the casing 630. Moreover, an arrow in FIG. 6 shows a flow of the exhaust gas.

In FIG. 6, the structure of the honeycomb filter 60 may be the same as the honeycomb structural body 10 shown in FIG. 1 or the same as the honeycomb structural body shown in FIG. 3.

Further, on the wall portion of the honeycomb structural body is carried a catalyst such as Pt or the like for promoting combustion of particulates through a catalyst support member consisting of γ-alumina or the like which is not illustrated.

In the exhaust gas purification apparatus 600 having such a construction, the exhaust gas discharged from the internal combustion engine such as an engine or the like is introduced into the casing 630 through the inlet pipe 640, passes from through-holes of the honeycomb filter through the wall portions (partitions) to catch particulates with the wall portions (partitions) for purification, and then discharged to an exterior through the outlet pipe 650.

Also, the regeneration treatment for burning and removing the particulates caught on the wall portions (partitions) of the honeycomb filter 60 is continuously carried out with the use of the catalyst supported on the wall portions, or regularly carried out after storing some amount.

Moreover, in the regeneration treatment, a heating means such as a heater or the like is arranged on the flow-in side of the exhaust gas and a gas heated by the heating means is flown into the inside of the through-holes of the honeycomb filter 60, whereby the honeycomb filter 60 may be heated to burn and remove particulates stored on the wall portions (partitions).

The particulates may be burnt and removed with the use of a post injection system.

In such an exhaust gas purification apparatus 600, the honeycomb filter 60 according to the invention is arranged so as to forcedly insert into the inside of the casing 630 at a state of winding the holding sealing material 620 around the outer periphery thereof. In this case, a significant compression load is applied to the honeycomb filter 60 according to the invention to create a large internal stress in the inside thereof, but since the honeycomb filter 60 according to the invention is excellent in compression strength as mentioned above, it can be set within the casing 630 without causing cracks.

EXAMPLES

Example 1

(1) At first, a thin film of amorphous silicon is made by a chemical vapor deposition method (plasma CVD method) using silane ($SiH_4$) and then the thin film is finely pulverized to obtain amorphous silicon powder having a mean particle size of 5 μm (half-width value of Si peak ($2\theta$=about 28°) in an X-ray diffraction measured by the following method is 5.0°).

20 wt % of the amorphous silicon powder and 80 wt % of α-type silicon carbide powder having a mean particle size of 30 μm are wet-mixed, and to 100 parts by weight of the thus obtained mixed powder are added and kneaded 6 parts by weight of a binder (methyl cellulose), 2.4 parts by weight of a surfactant (oleic acid) and 24 parts by weight of water to prepare a raw material paste.

Next, the raw material paste is filled in an extruder and extruded at a rate of 10 cm/min to prepare a green shaped body having substantially the same shape as that of the porous ceramic member 30 shown in FIG. 2.

Then, the green shaped body is dried by a microwave drier to form a ceramic dried body and thereafter a plugging paste having the same composition as that of the green shaped body is filled in predetermined through-holes and again dried by the drier, and degreased at 550° C. in an oxidizing atmosphere for 3 hours to obtain a ceramic degreased body.

Next, the ceramic degreased body is heated at 1000° C. in an argon atmosphere for 2 hours to fuse the amorphous silicon to thereby bond silicon carbide particles with the amorphous silicon to prepare a porous ceramic member of 34.3 mm×34.3 mm×254 mm in size (2) A large number of the above porous ceramic members are connected through a heat-resistant sealing material paste containing 30 wt % of alumina fibers of 0.2 mm in fiber length, 21 wt % of silicon carbide particles of 0.6 μm in mean particle size, 15 wt % of silica sol, 5.6 wt % of carboxymethyl cellulose and 28.4 wt % of water by the method explained with reference to FIG. 5 and then cut with a diamond cutter to prepare a cylindrical ceramic block having a diameter of 165 mm, a porosity of 60% and a mean pore size of 20 μm.

In this case, the thickness of the sealing material layer for connecting the porous ceramic members is adjusted to be 1.0 mm.

Next, a sealing material paste is prepared by mixing and kneading 23.3 wt % of ceramic fiber made of alumina silicate (shot content: 3%, fiber length: 0.1-100 mm) as an inorganic fiber, 30.2 wt % of silicon carbide powder having a mean particle size of 0.3 μm as an inorganic particle, 7 wt % of silica sol ($SiO_2$ content in sol: 30 wt %) as an inorganic binder, 0.5 wt % of carboxymethyl cellulose as an organic binder and 39 wt % of water.

Then, a sealing material paste layer of 1.0 mm in thickness is formed around the outer peripheral portion of the ceramic block by using the sealing material paste. And, the sealing paste layer is dried at 120° C. to prepare a cylindrical honeycomb structural body functioning as a honeycomb filter for purifying an exhaust gas.

Example 2

(1) A porous ceramic member is produced in the same manner as in Example 1(1) except that the firing condition in the bonding of silicon carbide particles with amorphous silicon is 1000° C. and 1 hour.
(2) A honeycomb structural body to be functioned as a honeycomb filter for purifying an exhaust gas is produced in the same manner as in Example 1(2) except for the use of the porous ceramic member produced in the above item (1).

Example 3

(1) A porous ceramic member is produced in the same manner as in Example 1(1) except that the firing condition after the bonding of silicon carbide particles with amorphous silicon is 1000° C. and 30 minutes.
(2) A honeycomb structural body to be functioned as a honeycomb filter for purifying an exhaust gas is produced in the same manner as in Example 1(2) except for the use of the porous ceramic member produced in the above item (1).

Example 4

(1) A porous ceramic member is produced in the same manner as in Example 1(1) except that the firing condition after the bonding of silicon carbide particles with amorphous silicon is 950° C. and 30 minutes.
(2) A honeycomb structural body to be functioned as a honeycomb filter for purifying an exhaust gas is produced in the same manner as in Example 1(2) except for the use of the porous ceramic member produced in the above item (1).

Comparative Example 1

(1) A porous ceramic member is produced in the same manner as in Example 1(1) except that the firing condition after the bonding of silicon carbide particles with amorphous silicon (half-width value of 1.5) is 1500° C. and 2 hours.
(2) A honeycomb structural body to be functioned as a honeycomb filter for purifying an exhaust gas is produced in the same manner as in Example 1(2) except for the use of the porous ceramic member produced in the above item (1).

Comparative Example 2

(1) A porous ceramic member is produced in the same manner as in Example 1(1) except that silica sol (SiO2 content in sol: 30 wt %) is used instead of the amorphous silicon powder.
(2) A honeycomb structural body to be functioned as a honeycomb filter for purifying an exhaust gas is produced in the same manner as in Example 1(2) except for the use of the porous ceramic member produced in the above item (1).

Comparative Example 3

(1) A porous ceramic member is produced in the same manner as in Example 1(1) except that the firing condition after the bonding of silicon carbide particles with metallic silicon (half-width value of 0.60) is 1500° C. and 2 hours.
(2) A honeycomb structural body to be functioned as a honeycomb filter for purifying an exhaust gas is produced in the same manner as in Example 1(2) except for the use of the porous ceramic member produced in the above item (1).

Comparative Example 4

(1) A porous ceramic member is produced in the same manner as in Example 1(1) except that the firing condition after the bonding of silicon carbide particles with metallic silicon (half-width value of 0.60) is 1800° C. and 3 hours.
(2) A honeycomb structural body to be functioned as a honeycomb filter for purifying an exhaust gas is produced in the same manner as in Example 1(2) except for the use of the porous ceramic member produced in the above item (1).

Test Example 1

(1) A porous ceramic member is produced in the same manner as in Example 1(1) except that the firing condition after the bonding of silicon carbide particles with amorphous silicon is 900° C. and 2 hours.
(2) A honeycomb structural body to be functioned as a honeycomb filter for purifying an exhaust gas is produced in the same manner as in Example 1(2) except for the use of the porous ceramic member produced in the above item (1).

Example 5

(1) At first, a thin film of amorphous silicon is produced by a chemical vapor deposition method (plasma CVD method) using silane ($SiH_4$), and then the thin film is finely pulverized to obtain amorphous silicon powder (half-width value: 5.0°) having a mean particle size of 30 μm.

20 wt % of the amorphous silicon powder and 80 wt % of α-type silicon carbide powder of 10 μm in mean particle diameter are wet-mixed, and to 100 parts by weight of the obtained mixed powder are added and kneaded 6 parts by weight of an organic binder (methyl cellulose), 2.5 parts by weight of a surfactant (oleic acid) and 24 parts by weight of water to prepare a raw material paste.

Next, a green shaped body is prepared in the same manner as in Example 1 except for the use of the raw material paste, and thereafter a ceramic degreased body is produced, and a porous ceramic member is produced.

(2) After a cylindrical ceramic block is produced in the same manner as in Example 1(2), a cylindrical honeycomb structural body to be functioned as a honeycomb filter for purifying an exhaust gas is produced.

The ceramic block of Example 5 has a porosity of 50% and a mean particle size of 10 μm.

Example 6

(1) A porous ceramic member is produced in the same manner as in Example 5(1) except that the firing condition after the bonding of silicon carbide particles with amorphous silicon is 1000° C. and 1 hour.

(2) A honeycomb structural body to be functioned as a honeycomb filter for purifying an exhaust gas is produced in the same manner as in Example 5(2) except for the use of the porous ceramic member produced in the above item (1).

Example 7

(1) A porous ceramic member is produced in the same manner as in Example 5(1) except that the firing condition after the bonding of silicon carbide particles with amorphous silicon is 1000° C. and 30 minutes.

(2) A honeycomb structural body to be functioned as a honeycomb filter for purifying an exhaust gas is produced in the same manner as in Example 5(2) except for the use of the porous ceramic member produced in the above item (1).

Example 8

(1) A porous ceramic member is produced in the same manner as in Example 5(1) except that the firing condition after the bonding of silicon carbide particles with amorphous silicon is 950° C. and 30 minutes.

(2) A honeycomb structural body to be functioned as a honeycomb filter for purifying an exhaust gas is produced in the same manner as in Example 5(2) except for the use of the porous ceramic member produced in the above item (1).

Comparative Example 5

(1) A porous ceramic member is produced in the same manner as in Example 5(1) except that the firing condition after the bonding of silicon carbide particles with amorphous silicon (half-width value: 1.5) is 1500° C. and 2 hours.

(2) A honeycomb structural body to be functioned as a honeycomb filter for purifying an exhaust gas is produced in the same manner as in Example 5(2) except for the use of the porous ceramic member produced in the above item (1).

Comparative Example 6

(1) A porous ceramic member is produced in the same manner as in Example 5(1) except that silica sol ($SiO_2$ content in sol: 40 wt %) is used instead of the amorphous silicon powder.

(2) A honeycomb structural body to be functioned as a honeycomb filter for purifying an exhaust gas is produced in the same manner as in Example 5(2) except for the use of the porous ceramic member produced in the above item (1).

Comparative Example 7

(1) A porous ceramic member is produced in the same manner as in Example 5(1) except that the firing condition after the bonding of silicon carbide particles with metallic silicon (half-width value: 0.6°) is 1500° C. and 2 hours.

(2) A honeycomb structural body to be functioned as a honeycomb filter for purifying an exhaust gas is produced in the same manner as in Example 5(2) except for the use of the porous ceramic member produced in the above item (1).

Comparative Example 8

(1) A porous ceramic member is produced in the same manner as in Example 5(1) except that the firing condition after the bonding of silicon carbide particles with metallic silicon (half-width value: 0.6°) is 1800° C. and 3 hours.

(2) A honeycomb structural body to be functioned as a honeycomb filter for purifying an exhaust gas is produced in the same manner as in Example 5(2) except for the use of the porous ceramic member produced in the above item (1).

Test Example 2

(1) A porous ceramic member is produced in the same manner as in Example 5(1) except that the firing condition after the bonding of silicon carbide particles with amorphous silicon is 900° C. and 2 hours.

(2) A honeycomb structural body to be functioned as a honeycomb filter for purifying an exhaust gas is produced in the same manner as in Example 5(2) except for the use of the porous ceramic member produced in the above item (1).

Example 9

(1) 20 wt % of the amorphous powder (half-width value: 5.00) and 80 wt % of alumina powder of 30 μm in mean particle diameter are wet-mixed, and to 100 parts by weight of the thus mixed powder are added and kneaded 6 parts by weight of an organic binder (methyl cellulose), 2.5 parts by weight of a surfactant (oleic acid) and 24 parts by weight of water to prepare a raw material paste.

Next, the raw material paste is filled in an extruder and extruded at a rate of 10 cm/min to form a green shaped body having substantially the same shape as in the porous ceramic member 30 shown in FIG. 3.

Then, the green shaped body is dried by a microwave drier to form a ceramic dried body and a plugging paste having the same composition as that of the green shaped body is filled in predetermined through-holes and again dried by the drier and degreased in an oxidizing atmosphere at 550° C. for 3 hours to obtain a ceramic degreased body.

Thereafter, the ceramic degreased body is heated in an argon atmosphere at 1000° C. for 2 hours to fuse the amorphous silicon to thereby bond silicon carbide particles with the amorphous silicon, whereby there is prepared a cylindrical porous ceramic member having a porosity of 45%, a mean pore size of 10 μm, a diameter of 144 mm and a length of 254 mm. This is rendered into a honeycomb structural body to be functioned as a honeycomb filter for purifying an exhaust gas.

Example 10

(1) A porous ceramic member (honeycomb structural body) is produced in the same manner as in Example 9 except that the firing condition for bonding alumina particles with amorphous silicon is 1000° C. and 1 hour.

Example 11

(1) A porous ceramic member (honeycomb structural body) is produced in the same manner as in Example 9 except that the firing condition for bonding alumina particles with amorphous silicon is 1000° C. and 0.5 hour.

Example 12

(1) A porous ceramic member (honeycomb structural body) is produced in the same manner as in Example 9 except that the firing condition for bonding alumina particles with amorphous silicon is 950° C. and 0.5 hour.

Comparative Example 9

(1) A porous ceramic member (honeycomb structural body) is produced in the same manner as in Example 9 except that the firing condition for bonding alumina particles with amorphous silicon (half-width value: 1.5) is 1500° C. and 2 hours.

Comparative Example 10

(1) A porous ceramic member (honeycomb structural body) is produced in the same manner as in Example 9 except that the firing condition for bonding alumina particles with metallic silicon (half-width value: 0.6°) is 1500° C. and 2 hours.

Comparative Example 11

(1) A porous ceramic member (honeycomb structural body) is produced in the same manner as in Example 9 except that the firing condition for bonding alumina particles with metallic silicon (half-width value: 0.6°) is 1800° C. and 3 hours.

Comparative Example 12

(1) A porous ceramic member (honeycomb structural body) is produced in the same manner as in Example 9 except that silica sol (SiO2 content in sol: 30 wt %) is used instead of the amorphous silicon powder.

Test Example 3

(1) A porous ceramic member (honeycomb structural body) is produced in the same manner as in Example 9 except that the firing condition for bonding alumina particles with amorphous silicon is 900° C. and 2 hours.

Example 13

(1) 20 wt % of the amorphous silicon powder (half-width value: 5.0°) and 80 wt % of alumina powder of 10 μm in mean particle size are wet-mixed, and to 100 parts by weight of the thus mixed powder are added and kneaded 6 parts by weight of an organic binder (methyl cellulose), 2.5 parts by weight of a surfactant (oleic acid) and 24 parts by weight of water to prepare a raw material paste.

Next, the raw material paste is filled in an extruder and extruded at a rate of 10 cm/min to prepare a green shaped body having substantially the same shape as that of the porous ceramic member 30 shown in FIG. 3.

Then, the green shaped body is dried by a microwave drier and a plugging paste having the same composition as in the green shaped body is filled in predetermined through-holes and again dried by the drier and degreased in an oxidizing atmosphere at 550° C. for 3 hours to obtain a ceramic degreased body.

Thereafter, the ceramic degreased body is heated in an argon atmosphere at 1000° C. for 2 hours to fuse amorphous silicon to bond silicon carbide particles with amorphous silicon, whereby there is produced a cylindrical honeycomb member having a porosity of 60%, a mean pore size of 20 μm, a diameter of 144 mm and a length of 254 mm. This is rendered into a honeycomb structural body to be functioned as a honeycomb filter for purifying an exhaust gas.

Example 14

(1) A porous ceramic member (honeycomb structural body) is produced in the same manner as in Example 13 except that the firing condition for bonding alumina particles with amorphous silicon is 1000° C. and 1 hour.

Example 15

(1) A porous ceramic member (honeycomb structural body) is produced in the same manner as in Example 13 except that the firing condition for bonding alumina particles with amorphous silicon is 1000° C. and 0.5 hour.

Example 16

(1) A porous ceramic member (honeycomb structural body) is produced in the same manner as in Example 13 except that the firing condition for bonding alumina particles with amorphous silicon is 950° C. and 0.5 hour.

Comparative Example 13

(1) A porous ceramic member (honeycomb structural body) is produced in the same manner as in Example 13 except that the firing condition for bonding alumina particles with amorphous silicon (half-width value: 1.5) is 1500° C. and 2 hours.

Comparative Example 14

(1) A porous ceramic member (honeycomb structural body) is produced in the same manner as in Example 13 except that the firing condition for bonding alumina particles with metallic silicon (half-width value: 0.6°) is 1500° C. and 2 hours.

Comparative Example 15

(1) A porous ceramic member (honeycomb structural body) is produced in the same manner as in Example 13 except that the firing condition for bonding alumina particles with metallic silicon (half-width value: 0.6°) is 1800° C. and 3 hours.

Comparative Example 16

(1) A porous ceramic member (honeycomb structural body) is produced in the same manner as in Example 13 except that silica sol ($SiO_2$ content in sol: 30 wt %) is used instead of the amorphous silicon powder.

Test Example 4

(1) A porous ceramic member (honeycomb structural body) is produced in the same manner as in Example 13 except that the firing condition for bonding alumina particles with amorphous silicon is 900° C. and 2 hours.

With respect to the honeycomb structural bodies of Examples 1-16, Comparative Examples 1-16 and Test Examples 1-4 are conducted the following evaluation tests (A)-(C).

(A) Evaluation Test of the Crystallinity of Amorphous Silicon Bonding Silicon Carbide Particles There is measured a half-width value of Si peak (2θ=about 28°) in an X-ray diffraction of the honeycomb structural bodies (and silicon raw material) according to Examples 1-16, Comparative Examples 1-16 and Test Example 1-4.

The results are shown in the following Tables 1 and 2.

An X-ray diffraction meter used in this analytical measurement is RIGAKU RINT-2500 made by Rikagaku Denki Co., Ltd. A light source of X-ray tube diffraction is CuKα1, and as a measuring method, a sample is first pulverized and homogenized and filled in a sample holder made of glass, and then the sample holder filled with the sample is set on a sample table of a goniometer, and a power source of the apparatus is switched while flowing a cooling water in an X-ray tube, and then a voltage is gradually increased to 40 kV, and a current controlling knob is turned to 30 mA. Thereafter, the measurement is conducted by setting each condition.

Moreover, the measuring conditions of X-ray diffraction are as follows: divergence slit: 0.5°, limit slit for longitudinal divergence: 10 mm, scattering slit: 0.5°, light-intercepting slit: 0.3 mm, monochrolight-intercepting slit: 0.8 mm, scanning mode: continuous, scanning rate: 5.000°/min, step: 0.01°, scanning range: 10.000°-60.000°, monochrometer: use of counter monochrometer, optical system: integrated optical system.

Further, in the honeycomb structural bodies according to Comparative Examples 2, 6, 12 and 16 is measured a half-width value of silica ($SiO_2$) peak (2θ=about 22°) in the X-ray diffraction.

(B) Evaluation Test (1) of Compression Strength

As an initial compression strength of the honeycomb structural body according to Examples 1-18, Comparative Examples 1-16 and Test Example 1-4, is measured an isostatic strength of the honeycomb structural body immediately after the production in each Example and Comparative Example.

Moreover, the isostatic strength means such a strength that the honeycomb structural body according to each Example and Comparative Example is sandwiched between aluminum sheets (thickness: 15 mm) and the whole is sealed by enclosing with an urethane rubber sheet (thickness: 2 mm) and pressurized at a pressing speed of 1.0 MPa/min by means of a cold hydrostatic pressure device (CIP) until the occurrence of breakage.

The results are shown in the following Tables 1 and 2.

(C) Evaluation Test (2) of Compression Strength

After a test of raising a temperature of the honeycomb structural body according to Examples 1-16 and Comparative Examples 1-16 to 800° C. at a rising rate of 10° C./min in an electric furnace, keeping the temperature for 30 minutes and thereafter quenching to room temperature (20° C.) is repeated 10 times, an isostatic strength is measured.

Further, after a central portion of a filter is cut, the cut surface is observed by SEM at 350 magnification to confirm whether or not cracks are generated at the bonded portion of ceramic particles at 10 spots.

The results are shown in the following Tables 1 and 2.

TABLE 1

| | Composition of composite member | Form of ceramic block | Mean pore size (μm) | Porosity (%) | Half-width value of Si raw material (°) | Firing Temperature (° C.) | Heating time (hour) | Half-width value of fired body (°) | Isostatic strength (MPa) Initial | Isostatic strength (MPa) After heat treatment | After treatment/Initial × 100 | Presence or Absence of crack (Observation of SEM image after heat treatment) |
|---|---|---|---|---|---|---|---|---|---|---|---|---|
| Example1 | SiC + Si | FIG. 1 | 20 | 60 | 5.0 | 1000 | 2 | 1 | 10 | 9 | 90.0 | absence |
| Example2 | SiC + Si | FIG. 1 | 20 | 60 | 5.0 | 1000 | 1 | 2 | 12 | 10 | 83.3 | absence |
| Example3 | SiC + Si | FIG. 1 | 20 | 60 | 5.0 | 1000 | 0.5 | 3 | 14 | 12 | 85.7 | absence |
| Example4 | SiC + Si | FIG. 1 | 20 | 60 | 5.0 | 950 | 0.5 | 4 | 15 | 12 | 80.0 | absence |
| Example5 | SiC + Si | FIG. 1 | 10 | 50 | 5.0 | 1000 | 2 | 1 | 12 | 10 | 83.3 | absence |
| Example6 | SiC + Si | FIG. 1 | 10 | 50 | 5.0 | 1000 | 1 | 2 | 15 | 12 | 80.0 | absence |
| Example7 | SiC + Si | FIG. 1 | 10 | 50 | 5.0 | 1000 | 0.5 | 3 | 18 | 14 | 77.8 | absence |
| Example8 | SiC + Si | FIG. 1 | 10 | 50 | 5.0 | 950 | 0.5 | 4 | 20 | 15 | 75.0 | absence |
| Comparative Example1 | SiC + Si | FIG. 1 | 20 | 60 | 1.5 | 1500 | 2 | 0.8 | 6 | 4 | 66.7 | presence |
| Comparative Example2 | SiC + SiO2 | FIG. 1 | 20 | 60 | — | 1000 | 2 | 2 | 12 | 6 | 50.0 | presence |
| Comparative Example3 | SiC + Si | FIG. 1 | 20 | 60 | 0.6 | 1500 | 2 | 0.65 | 5.5 | 3 | 54.5 | presence |
| Comparative Example4 | SiC + Si | FIG. 1 | 20 | 60 | 0.6 | 1800 | 3 | 0.7 | 5.8 | 3.2 | 55.2 | presence |
| Comparative Example5 | SiC + Si | FIG. 1 | 10 | 50 | 1.5 | 1500 | 2 | 0.8 | 8 | 5 | 62.5 | presence |
| Comparative Example6 | SiC + SiO2 | FIG. 1 | 10 | 50 | — | 1000 | 2 | 2 | 15 | 8 | 53.3 | presence |
| Comparative | SiC + Si | FIG. 1 | 10 | 50 | 0.6 | 1500 | 2 | 0.65 | 7.3 | 4 | 54.8 | presence |

TABLE 1-continued

| | Composition of composite member | Form of ceramic block | Mean pore size (μm) | Porosity (%) | Half-width value of Si raw material (°) | Firing Temperature (°C.) | Heating time (hour) | Half-width value of fired body (°) | Isostatic strength(MPa) | | | Presence or Absence of crack (Observation of SEM image after heat treatment) |
|---|---|---|---|---|---|---|---|---|---|---|---|---|
| | | | | | | | | | Initial | After heat treatment | After treatment/ Initial × 100 | |
| Example7 Comparative Example8 | SiC + Si | FIG. 1 | 10 | 50 | 0.6 | 1800 | 3 | 0.7 | 7.7 | 4.3 | 55.8 | presence |
| Test Example1 | SiC + Si | FIG. 1 | 20 | 60 | 5.0 | 900 | 2 | 5 | 15 | 11 | 73.3 | slightly presence |
| Test Example2 | SiC + Si | FIG. 1 | 10 | 50 | 5.0 | 900 | 2 | 5 | 20 | 14 | 70.0 | slightly presence |

TABLE 2

| | Composition of composite member | Form of ceramic block | Mean pore size (μm) | Porosity (%) | Half-width value of Si raw material (°) | Firing Temperature (°C.) | Heating time (hour) | Half-width value of fired body (°) | Isostatic strength(MPa) | | | Presence or Absence of crack (Observation of SEM image after heat treatment) |
|---|---|---|---|---|---|---|---|---|---|---|---|---|
| | | | | | | | | | Initial | After heat treatment | After treatment/ Initial × 100 | |
| Example9 | Alumina + Si | FIG. 3 | 20 | 60 | 5.0 | 1000 | 2 | 1 | 7.9 | 7 | 88.6 | absence |
| Example10 | Alumina + Si | FIG. 3 | 20 | 60 | 5.0 | 1000 | 1 | 2 | 9.5 | 7.9 | 83.2 | absence |
| Example11 | Alumina + Si | FIG. 3 | 20 | 60 | 5.0 | 1000 | 0.5 | 3 | 11 | 9.4 | 85.5 | absence |
| Example12 | Alumina + Si | FIG. 3 | 20 | 60 | 5.0 | 950 | 0.5 | 4 | 11.9 | 9.4 | 79.0 | absence |
| Example13 | Alumina + Si | FIG. 3 | 10 | 50 | 5.0 | 1000 | 2 | 1 | 9.5 | 7.8 | 82.1 | absence |
| Example14 | Alumina + Si | FIG. 3 | 10 | 50 | 5.0 | 1000 | 1 | 2 | 11.8 | 9.4 | 79.7 | absence |
| Example15 | Alumina + Si | FIG. 3 | 10 | 50 | 5.0 | 1000 | 0.5 | 3 | 14.2 | 11 | 77.5 | absence |
| Example16 | Alumina + Si | FIG. 3 | 10 | 50 | 5.0 | 950 | 0.5 | 4 | 15.8 | 11.8 | 74.7 | absence |
| Comparative Example9 | Alumina + Si | FIG. 3 | 20 | 60 | 1.5 | 1500 | 2 | 0.8 | 4.6 | 3 | 65.2 | presence |
| Comparative Example10 | Alumina + Si | FIG. 3 | 20 | 60 | 0.6 | 1500 | 2 | 0.65 | 4.2 | 2.2 | 52.4 | presence |
| Comparative Example11 | Alumina + Si | FIG. 3 | 20 | 60 | 0.6 | 1800 | 3 | 0.7 | 4.5 | 2.3 | 51.1 | presence |
| Comparative Example12 | Alumina + SiO2 | FIG. 3 | 20 | 60 | — | 1000 | 2 | 2 | 9.4 | 4.6 | 48.9 | presence |
| Comparative Example13 | Alumina + Si | FIG. 3 | 10 | 50 | 1.5 | 1500 | 2 | 0.8 | 6.2 | 3.9 | 62.9 | presence |
| Comparative Example14 | Alumina + Si | FIG. 3 | 10 | 50 | 0.6 | 1500 | 2 | 0.65 | 5.6 | 3 | 53.6 | presence |
| Comparative Example15 | Alumina + Si | FIG. 3 | 10 | 50 | 0.6 | 1800 | 3 | 0.7 | 6 | 3.2 | 53.3 | presence |
| Comparative Example16 | Alumina + SiO2 | FIG. 3 | 10 | 50 | — | 1000 | 2 | 2 | 11.8 | 6.2 | 52.5 | presence |
| Test Example 3 | Alumina + Si | FIG. 3 | 20 | 60 | 5.0 | 900 | 2 | 5 | 11 | 8.6 | 78.2 | slightly presence |
| Test Example4 | Alumina + Si | FIG. 3 | 10 | 50 | 5.0 | 900 | 2 | 5 | 15 | 11 | 73.3 | slightly presence |

As seen from the results shown in Table 1 and Table 2, the half-width value of Si peak (2θ=about 28°) in the X-ray diffraction of the honeycomb structural body according to each Example is 1.0-4.0°, which is not less than 1.0° and the crystallinity is low.

Figure 7:
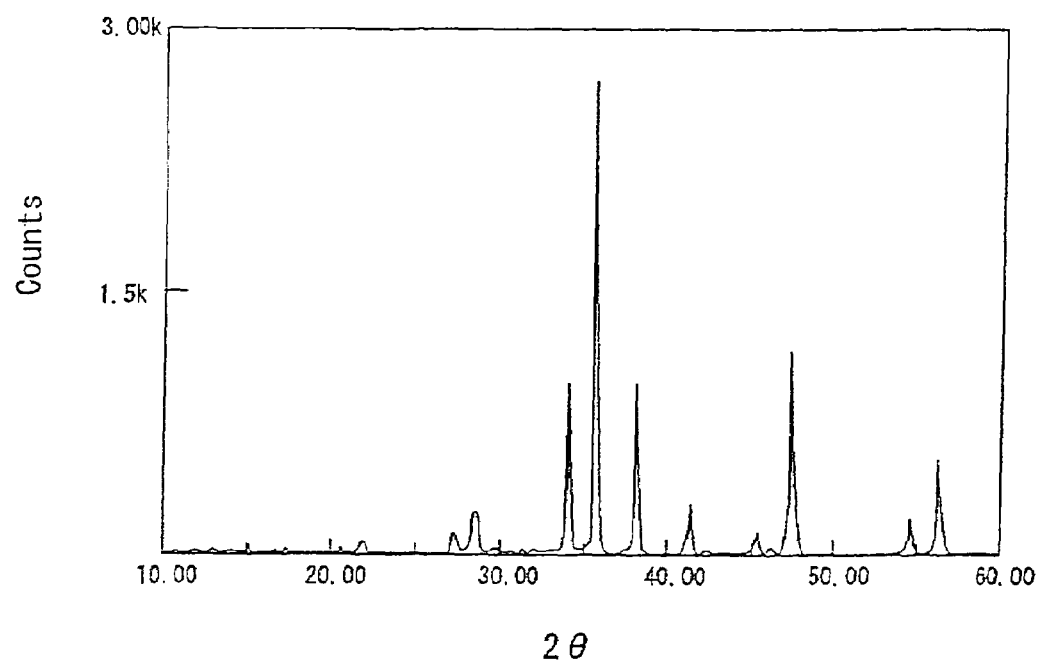
FIG. 7 is a graph showing an X-ray diffraction of the honeycomb structural body of Example 1.
Figure 8:
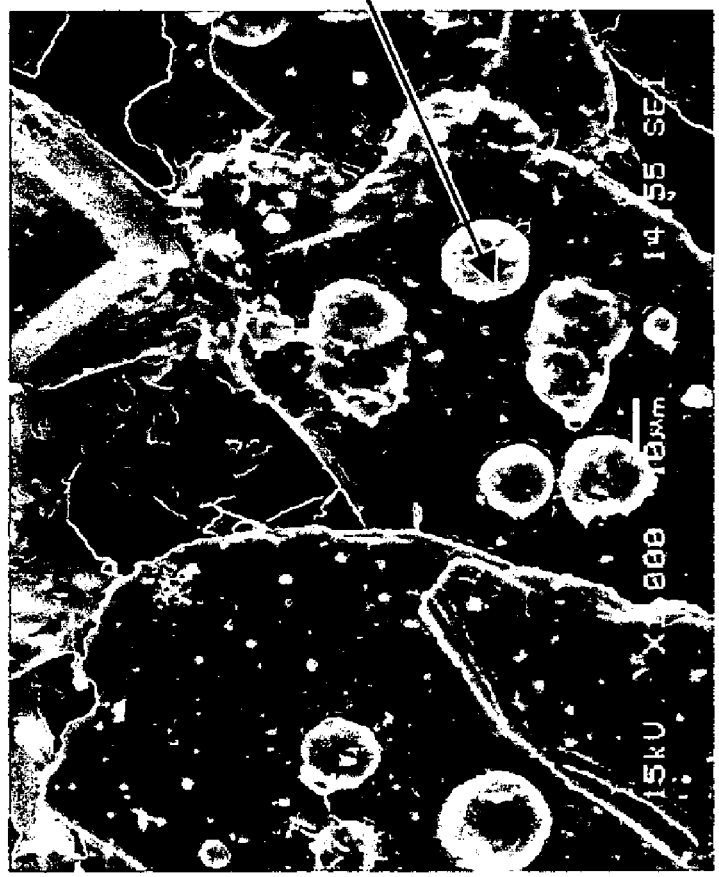
FIG. 8 is an SEM photograph (1000 magnification) showing a section of the honeycomb structural body of Example 1.

In FIG. 7 is shown a graph of X-ray diffraction of the honeycomb structural body of Example 1. As shown in FIG. 7, the half-width value of Si peak (2θ=about 28.0°) in the X-ray diffraction of the honeycomb structural body of Example 1 is 1.0°.

On the other hand, the half-width value of Si peak (2θ=about 28°) in the X-ray diffraction of the honeycomb structural body according to Comparative Examples 1, 3-5, 7-11 and 13-15 is 0.65-0.8°, which is less than 1.0° and the crystallinity is somewhat high.

Also, the half-width value of SiO$_2$ peak (2θ=about 22°) in the X-ray diffraction of the honeycomb structural body according to Comparative Examples 2, 6, 12 and 16 is 2.0°.

Further, the half-width value of Si peak (2θ=about 28°) in the X-ray diffraction of the honeycomb structural body according to Test Examples 1-4 is 5.0°.

First, when silicon carbide and SiO/SiO$_2$ are examined, from the results of the evaluation test (1) of compression strength, the initial isostatic strength of the honeycomb structural body according to each Example and Comparative Example 2 and 6 is 10.0-20.0 MPa, which exceeds 10.0 MPa.

On the other hand, the initial isostatic strength of the honeycomb structural body according to Comparative Examples 1, 3-5, 7 and 8 is less than 10.0 MPa.

Further, from the results of the evaluation test (2) of compression strength, the isostatic strength after the heat treatment of the honeycomb structural body according to each Example is 9.0-15.0 MPa, which is maintained at not less than 75% of the initial isostatic strength.

On the other hand, the isostatic strength after the heat treatment of the honeycomb structural body according to Comparative Examples is 4.0-8.0 MPa, which is lower than that of the honeycomb structural body according to Examples.

Particularly, the isostatic strength after the heat treatment of the honeycomb structural body according to Comparative Examples 2 and 6 is 6 MPa and 8 MPa, respectively, which are largely lowered to 50% and 53% of the initial isostatic strength.

Moreover, from the results of Test Examples, the initial isostatic strength of the honeycomb structural body according to Test Examples 1 and 2 is 15 MPa and 20 MPa, but become 11 MPa and 14 MPa after the heat treatment, which are lowered to 73% and 70% of the initial isostatic strength.

Finally, as observed by SEM image, no crack is generated in each Example, but the occurrence of cracks is observed at more than 8 spots in the comparative examples, while cracks are observed at 1 or 2 spots in Test Example, and some pores are clogged in the portion having no crack.

From the results of the evaluation tests (1) and (2) of compression strength, the honeycomb structural bodies having a half-width value of Si peak (2θ=about 28°) in the X-ray diffraction of not less than 1.0° in each Example is low in the crystallinity of amorphous silicon for bonding silicon carbide particles and excellent in the compression strength, so that the compression strength is not lowered even after the heat treatment.

On the other hand, the honeycomb structural body having a half-width value of Si peak (2θ=about 28°) in the X-ray diffraction of less than 1.0° is high in the crystallinity of silicon for bonding silicon carbide particles and poor in the compression strength.

Also, the honeycomb structural body composed by bonding silicon carbide particles with silica has a half-width value of $SiO_2$ peak (2θ=about 22°) in the X-ray diffraction of 2.0° and is low in the crystallinity and excellent in the initial compression strength, but the crystallinity of silica becomes high by the application of the heat treatment and the compression strength after the heat treatment lowers.

Further, when alumina and $SiO/SiO_2$ are examined, from the results of the evaluation test (1) of compression strength, the initial isosatic strength of the honeycomb structural body according to each Example and Comparative Examples 2 and 6 is 7.9-15.8 MPa, which exceeds 7.0 MPa.

On the other hand, the initial isostatic strength of the honeycomb structural body according to Comparative Examples 9-11 and 13-15 is less than 7.0 MPa.

Further, from the results of the evaluation test (2) of compression strength, the isostatic strength of the honeycomb structural body after the heat treatment in each Example was 7.0-11.8 MPa, which is maintained at more than 74.7% of the initial isostatic strength.

On the other hand, the isostatic strength of the honeycomb structural body after the heat treatment according to Comparative Examples is 3.0-6.2 MPa, which is lower than that of the honeycomb structural body according to Examples.

Particularly, the isostatic strengths of the honeycomb structural bodies according to Comparative Examples 12 and 16 are 4.6 MPa and 6.2 MPa, respectively, which are largely lowered to 48.8% and 52.53% of the initial isostatic strength.

Moreover, it is understood from the results of Test Examples that the initial isostatic strength of the honeycomb structural body according to Test Examples 3 and 4 is 11 MPa and 15 MPa, but become 8.6 MPa and 11 MPa after the heat treatment, which are lowered to 78.2% and 73.3% of the initial isostatic strength.

Finally, when SEM image observation is carried out, no crack is generated in each example, but cracks are generated at more than 8 spots in Comparative Examples, while one and two cracks are generated and some pores are clogged at the portion having no crack in Test Examples.

From the results of the evaluation tests (1) and (2) of compression strength, the honeycomb structural body of each example, in which the half-width value of Si peak (2θ=about 28°) in the X-ray diffraction is not less than 1.0°, is low in the crystallinity of amorphous silicon for bonding alumina particles and excellent in the compression strength, and hence the compression strength is not lowered even after the heat treatment.

On the other hand, the honeycomb structural body having a half-width value of Si peak (2θ=about 28°) in the X-ray diffraction of less than 1.0° is high in the crystallinity of silicon for bonding alumina particles and poor in the compression strength.

Also, the honeycomb structural body made by bonding alumina particles with silica has a half-width value of $SiO_2$ peak (2θ=about 22°) in the X-ray diffraction of 2.0° is low in the crystallinity and excellent in the initial compression strength, but the crystallinity of silica become high by subjecting to the heat treatment and the compression strength after the heat treatment lowers.

INDUSTRIAL APPLICABILITY

As explained above, the honeycomb structural body according to the invention is constituted with a composite member consisting of ceramic particles and amorphous silicon, and can favorably mitigate an internal stress at bonding points between ceramic particles (amorphous silicon) even when a large compression strength is applied to cause a large internal stress in the inside, so that the durability is excellent without generating cracks. This honeycomb structural body can be used as a filter for purifying HC, CO, NOx and the like in an exhaust gas discharged from a heat engine such as an internal combustion engine or the like, or a combustion apparatus such as a boiler or the like, or as a catalyst carrier for conducting a reformation of liquid fuel or gas fuel by carrying a catalyst of a noble metal such as Pt, Rh, Pd or the like or an alloy thereof on a ceramic block constituting the honeycomb structural body, if necessary.

The invention claimed is:

1. A honeycomb structural body comprising:
a ceramic block made by arranging a plurality of through-holes side by side in a longitudinal direction through partition walls and sealing either one end portions of the through-holes,
wherein the ceramic block comprises a composite material comprising ceramic particles and amorphous silicon.

2. A honeycomb structural body according to claim 1, wherein the ceramic block is made by bonding a plurality of prismatic ceramic members each having a plurality of through-holes arranged side by side in the longitudinal direction through partition walls with sealing material layers.

3. A honeycomb structural body according to claim 1, wherein a plurality of through-holes are plugged with a plugging material at one end portion of the ceramic block and through-holes not plugged with the plugging material are plugged with a plugging material at the other end portion thereof.

4. A honeycomb structural body according to claim 1, wherein the composite material is a porous ceramics formed by bonding ceramic particles through amorphous silicon.

5. A honeycomb structural body according to claim 1, wherein the ceramic particle is silicon carbide.

6. A honeycomb structural body according to claim 1, wherein the amorphous silicon has a half-width value of Si peak (2θ=about 28°) of an X-ray diffraction of not less than 1.0°.

7. A honeycomb structural body comprising:
a ceramic member having a plurality of through holes that are placed in parallel with one another in a length direction with partition wall interposed therebetween and are sealed at either one end portions of the through holes,
wherein the ceramic member comprises a composite material including ceramic particles and amorphous silicon.

8. A honeycomb structural body according to claim 7, wherein the plurality of through-holes are plugged with a plugging material at either one end portions of the through holes.

9. A honeycomb structural body according to claim 7, wherein the composite material is a porous ceramics comprising the ceramic particles bonded one another through the amorphous silicon.

10. A honeycomb structural body according to claim 7, wherein the ceramic particle is silicon carbide.

11. A honeycomb structural body according to claim 7, wherein the amorphous silicon has a half-width value of Si peak (2θ=about 28°) of an X-ray diffraction of not less than 1.0°.

12. A honeycomb structural body according to claim 7, wherein through-holes plugged at one end portion of the through holes are located adjacent to through-holes plugged at the other end portion of the through holes.

13. A honeycomb structural body comprising:
a plurality of ceramic members combined with one another, the ceramic members each having a plurality of through holes extending in parallel with one another in a length direction with partition wall interposed therebetween and are sealed at either one end portions of the through holes,
wherein the plurality of ceramic members each comprise a composite material including ceramic particles and amorphous silicon.

14. A honeycomb structural body according to claim 13, wherein the plurality of ceramic members are arranged side by side in the length direction with sealing material layers therebetween.

15. A honeycomb structural body according to claim 13, wherein the plurality of through-holes are plugged with a plugging material at either one end portions of the through holes.

16. A honeycomb structural body according to claim 13, wherein the composite material is a porous ceramics comprising the ceramic particles bonded one another through the amorphous silicon.

17. A honeycomb structural body according to claim 13, wherein the ceramic particle is silicon carbide.

18. A honeycomb structural body according to claim 13, wherein the amorphous silicon has a half-width value of Si peak (2θ=about 28°) of an X-ray diffraction of not less than 1.0°.

19. A honeycomb structural body according to claim 13, wherein through-holes plugged at one end portion of the through holes are located adjacent to through-holes plugged at the other end portion of the through holes.

* * * * *